United States Patent [19]
Gitman et al.

[11] Patent Number: 5,858,302
[45] Date of Patent: Jan. 12, 1999

[54] APPARATUS FOR ELECTRIC STEELMAKING

[75] Inventors: Gregory M. Gitman, Atlanta, Ga.; Grigori Galperine, Novokuznetsk; Stanislav I. Zhigach, St. Petersburg, both of Russian Federation

[73] Assignee: American Combustion, Inc., Norcross, Ga.

[21] Appl. No.: 746,206

[22] Filed: Nov. 6, 1996

Related U.S. Application Data

[60] Division of Ser. No. 520,685, Aug. 29, 1995, which is a continuation-in-part of Ser. No. 336,984, Nov. 10, 1994, Pat. No. 5,599,375, which is a continuation-in-part of Ser. No. 297,686, Aug. 29, 1994, abandoned.

[51] Int. Cl.$^6$ .................................................. C21B 13/12
[52] U.S. Cl. ......................... 266/182; 266/225; 266/226; 266/267; 432/13
[58] Field of Search .................................. 266/267, 182, 266/225, 226; 432/13

[56] References Cited

U.S. PATENT DOCUMENTS

| | | | |
|---|---|---|---|
| 3,418,108 | 12/1968 | Von Stroh | 266/221 |
| 3,429,300 | 2/1969 | Eisentrout . | |
| 3,729,285 | 4/1973 | Schwedersky | 431/8 |
| 3,856,457 | 12/1974 | Miller | 431/353 |
| 4,147,116 | 4/1979 | Graybill | 110/263 |
| 4,362,556 | 12/1982 | Kishida | 75/10.42 |
| 4,422,391 | 12/1983 | Izuha et al. | 110/347 |
| 4,428,309 | 1/1984 | Chang et al. | 110/262 |
| 4,541,796 | 9/1985 | Anderson | 431/187 |
| 4,622,007 | 11/1986 | Gitman | 432/13 |
| 4,642,047 | 2/1987 | Gitman | 432/13 |
| 4,671,765 | 6/1987 | Tsai | 432/13 |
| 4,752,330 | 6/1988 | Gitman | 75/59.19 |
| 4,797,087 | 1/1989 | Gitman | 431/10 |
| 4,861,262 | 8/1989 | Gitman et al. | 431/5 |
| 4,865,297 | 9/1989 | Gitman | 266/226 |
| 4,890,562 | 1/1990 | Gitman | 110/236 |
| 5,042,964 | 8/1991 | Gitman | 432/13 |

FOREIGN PATENT DOCUMENTS

| 2681417 | 3/1993 | France | 266/267 |
|---|---|---|---|

OTHER PUBLICATIONS

A.M. Sizor, Gasdynamic and heat exchange of gaseous jets in metallurgical processes, Moscow, Metallurgy (1987) Month unavailable.

*Primary Examiner*—Melvyn Andrews
*Attorney, Agent, or Firm*—Needle & Rosenberg, PC

[57] ABSTRACT

A burner/injector for providing a localized impingement flame or multiple flames for scrap heating and melting through use of a fluid fuel and at least one oxygen rich oxidizing gas. The burner/injector includes a liquid-cooled combustor for generating an impinging flame directed toward a scrap pile and a structure for injecting a controllable amount of a solid carbonaceous fuel and a controllable flow of high velocity oxidizing gas into space that has been previously occupied by the impinging flame. The burner/injector may be equipped to inject a solid slag forming materials and/or slag deoxidizing materials and/or to inject an additional oxidizing gas for burning a small portion of preheated scrap, post-combustion of CO and iron-carbon melt refining. The burner/injector may be arranged as a simple liquid-cooled combustor permanently mounted through the furnace wall or roof, and may be equipped with single or multiple channels for injection of solid material and high velocity oxidizing gas. Separate injecting lances for high velocity oxidizing gas and/or solid carbonaceous fuel may be mounted on the furnace. Both the lances and the combustors may be equipped with a nozzles for additional injection of the additional oxidizing gas.

11 Claims, 19 Drawing Sheets

APPARATUS FOR ELECTRIC STEELMAKING

This application is a application divisional Ser. No. 08/520,685 filed Aug. 29, 1995, which status is pending, which is continuation-in-part of Ser. No. 08/336,984, filed Nov. 10, 1994, which is now U.S. Pat. No. 5,599,375, and which is a continuation in part of Ser. No. 08/297,686, filed Aug. 29, 1994, which status is abandoned.

BACKGROUND OF THE INVENTION

The present invention relates to a method and apparatus for making steel in an electric arc furnace ("EAF") equipped with an auxiliary heat source including means for introducing an auxiliary fuel and an oxidizing gas into the furnace for the purpose of reducing the consumption of electrical energy and increasing furnace throughput rate.

More particularly, the present invention relates to a method of making steel in an electric arc furnace equipped with at least one burner that comprises a means for injection of solid carbonaceous fuel and/or oxygen.

Previously known methods of electric steelmaking include multiple movable or permanently fixed burners utilizing hydrocarbon fuel such as, for example, natural gas or oil, at least one movable oxygen lance for injection of a stream of oxygen toward the molten bath for refining purposes and a movable means for injecting solid carbonaceous fuel for combustion and slag foaming purposes.

When an electric arc furnace operates without burners, the charged scrap is rapidly melted at the hot spots at regions of highest electric current density. This creates harsh conditions for the water cooled furnace wall and refractory lining located adjacent to the hot spots due to excessive exposure to heat from the arc during the last part of the melt down cycle. Scrap located in the cold spots, in contrast, receives heat from the arc at a reduced rate during the melt down cycle, thereby continuing to protect the water cooled panels and the part of the refractory lining located at cold spots of the electric arc furnace from excessive exposure to heat at the end of the melt down cycle. This asymmetrical heat distribution from the arc and non-uniform wear of the furnace walls are typical for both alternating current and direct current arc furnaces operating without burners.

Presently known burners for electric arc steelmaking use either oxygen or a combination of oxygen and air to oxidize hydrocarbon fuel. These burners are preferably installed at the relatively colder spots of the furnace primarily to provide auxiliary heat during scrap melting in order to make the melting pattern more uniform.

Cold spots are typically formed in areas further away from the furnace arc as scrap located in these areas receives electrical energy at a reduced rate per ton of scrap. A typical example of such a cold spot is the tapping spout, due to its distance from the arc. Another cold spot exists at the slag door due to excessive heat losses to ambient air infiltrated through this area. It is common for furnaces using additional injection of materials (such as slag forming material, direct reduced iron, etc.) which is carried out through the slag door or through an opening in the furnace side wall) to create cold spots due to localized charging of additional heat consuming materials during the melt down cycle. Thus, a portion of the working volume of the furnace at the cold spots is continuously occupied with build-ups that are melted only at the end of the melt down cycle or that remain unmelted at the end of the melt down cycle when the furnace has reached its highest temperature. These build-ups reduce the working volume available for scrap to be charged and, therefore, reduce furnace throughput capacity.

Electric arc furnaces equipped with burners located at cold spots provide improved uniformity of scrap melting and reduce build-ups of materials at the cold spots. When auxiliary heat sources such as burners are placed in the electric arc furnace, their location is chosen to avoid further overheating of hot spots which result from the rapid melting of scrap located between the electrode and the furnace shell. More specifically, the burners are located as far away from hot spots as is practically possible and the burner flame outlet opening direction is chosen so that flame penetration occurs predominantly into the scrap pile located at the cold spots.

The same philosophy is used to select the location of other additional auxiliary heat sources such as oxygen injection lances. When additional lances are located at the cold spot(s), the exothermic energy of melt refining can be used more effectively to melt the scrap without overheating of the hot spots.

Injection of oxygen for melt decarburization is accomplished by one or more movable devices such as submerged, consumable oxygen pipes and/or by one or more water-cooled non-submerged oxygen lances. During operation of the water-cooled lance, the lance is first introduced into the furnace, then gradually moved to the position in which the lance discharge opening or openings for the introduction of oxygen preferably are positioned, approximately 150 to 300 mm or more above the bath. The discharge velocity of the oxygen stream from the water-cooled lance is to be chosen to allow the stream of oxygen introduced by the lance located in the above working position to penetrate the slag and to react with the iron-carbon melt without having molten metal splashing on the furnace walls and electrode(s).

The slag door is the largest opening commonly used for introduction of additional chemical energy of fuels into the furnace via burner means and carbon injection means. Unfortunately, opening the slag door results in a substantial infiltration of cold ambient air into the furnace, and the slag door is typically located further away from the electrode(s) than the furnace shell. This ambient air infiltration at a distance from the electrode(s) results in a lengthening of the time needed to melt scrap at the slag door when no auxiliary heat source is operated at the cold spot near the slag door.

Combined injection of carbon and oxygen via the dedicated lances through the slag door has become a common practice for adding extra heat to the process. An additional heat source is created by the oxidation of injected carbon with injected oxygen near the cold spot at the slag door. Carbon and oxygen are typically injected by a door lance using a lance manipulator to position oxygen and carbon injection lances through the slag door by remote control. These oxygen and carbon injection lances are usually held by a common carrying arm, so that their position is fixed relative to each other during manipulation. The supply of controllable carbon flow for injection is obtained from a carbonaceous material dispenser by a compressed gaseous carrier such as compressed air, natural gas, nitrogen, etc.

The use of the burners together with carbon and oxygen lances has allowed electric steelmakers to substantially reduce electrical energy consumption and to increase furnace production rate due to the additional heat input generated by the oxidation of carbon, and by significant increases in electric arc thermal efficiency achieved by the formation of a foamy slag layer above the iron-carbon melt that insulates the electric arc from heat losses. The foamy slag also stabilizes the electric arc and, therefore, allows a greater electrical power input rate. The foamy slag layer is created by carbon monoxide (CO) bubbles which are formed by the oxidation of injected carbon to CO. However, these improvements are achieved at the expense of creating a negative environmental impact due to the emission of CO.

The increased flow of injected carbon creates increased localized CO generation. Mixing the CO with oxygen inside of the electric arc furnace is desirable but very difficult to arrange without excessive oxidation of the slag and electrodes. Although the single point of carbon injection provides localized heat release capable of increasing the temperature at a local cold spot and of improving furnace thermal efficiency, the rate of carbon injection is typically kept relatively low because of the limited capability for dissipating the locally released heat and the limited ability of the locally generated CO stream to react with the additional oxygen stream creating environmentally acceptable $CO_2$ prior to being exhausted out of the furnace.

The most modern electric arc furnaces are equipped with some or all of the above-mentioned means for auxiliary heat input. Each auxiliary heat source plays a role to provide for additional heat input during a predetermined period of the steelmaking cycle at a predetermined cold spot area affected by the positioning of each device.

With the development of the burner modifications capable of withstanding molten steel and slag splashing (U.S. Pat. No. 4,622,007, Re 33464), the use of multiple auxiliary burners positioned at the cold spots has become a common practice. These burners can also provide oxygen injection to cut pieces of heavy scrap located at the cold spots and to assist in the slag foaming process.

A substantial increase in the use of oxygen for natural gas and carbon combustion in the electric arc furnace has reduced metallic yield due to excessive oxidation of scrap with injected oxygen. A portion of the FeO produced by the oxidation of scrap during the scrap melt down cycle is reduced back by reaction with carbon present in the slag. The reducing reaction of carbon and FeO is endothermic and, therefore, requires heat; thus, it can be effectively carried out only in hot slag containing particles of carbon which are well distributed in the slag. The reaction creates CO which bubbles through the slag forming a foamy slag layer.

Several known steelmaking methods that provide multiple point oxygen injection during the melt down cycle are based on the use of modified burners capable of high velocity oxygen injection following the burner firing cycle. (U.S. Pat. Nos. 4,622,007, 4,752,330). These methods use the burner flames to establish an empty space in the scrap pile adjacent to the burner nozzle and to establish a pool of molten iron-carbon melt on the bottom of the furnace by the partial melting of scrap at the cold spots. After the empty space and pool of molten iron-carbon melt is established, the dedicated burner or burners initiate high velocity oxygen injection throughout the empty space toward the iron-carbon melt. The reaction of the injected oxygen with carbon in the melt or the slag results in rapid foamy slag formation. To establish the presence of solid carbon particles prior to the end of the scrap melt down cycle, solid carbon may have been previously charged into the furnace. When charged carbon reacts with injected oxygen, the foamy slag is rapidly formed in the areas affected by the injection of oxygen through the burners. Unfortunately, attempts to continually charge carbon prior to the end of the burner firing cycle using known methods of carbon charging (with the scrap, through the hole in the furnace roof, or through the slag door) have not been very successful. This is because the charged carbon is quickly burned or carried out by the combustion products generated by the burners, creating a high level of CO emissions. On the other hand, earlier initiation of carbon injection through the slag door is not effective in creating a satisfactory foamy slag in other cold spot areas located far away from the slag door due to the presence of substantial amounts of unmolten scrap in the furnace. This unmolten scrap located at the slag door blocks injection of carbon into the furnace.

Therefore, there is a need for a method and apparatus capable of generating foamy slag by combined carbon and oxygen injection during the early stage of the scrap melting cycle in the area or areas affected by heat input of the burners. This combined injection should be initiated after a substantial portion of scrap charged in this area or areas is molten and after an empty space suitable for carbon injection on the top of the iron-carbon melt is formed by the burners.

To provide for rapid and efficient melting of scrap, electric arc furnace burners utilize a highly concentrated oxidizing gas containing oxygen or a combination of oxygen and air. The excess oxygen, when introduced by the burners, will react with scrap which has been heated by the burner flame.

Furthermore, it is considered advisable in many cases to introduce excess (e.g., above the stoichiometric ratio) amounts of oxygen through the burner to minimize incomplete combustion of fuel and to oxidize combustibles (e.g., oil, paint, plastics, etc.) charged with the scrap. Some known methods (U.S. Pat. No. 4,622,007, Re 33464) purposely use excessive oxygen to enhance hot scrap cutting to speed the scrap melting and to accelerate the rate at which the residual hot heavy scrap is submerged into the iron-carbon melt and, thus, to increase electric arc furnace throughput capacity and thermal efficiency. During the early stages of the melt down cycle, oxides charged with scrap and generated by the burners are mixed with the entire slag formed on the top of iron-carbon melt located near the burner locations. Therefore, it would be advantageous to inject small carbon particles into the slag layer near the burner locations and to provide heat to these spots to reduce iron oxides back to Fe. It would also be advantageous to use this reaction of iron-oxide reduction with carbon to foam slag earlier during the melt down cycle when a substantial amount of scrap has not yet melted around the slag door and when foamy slag generated at the slag door area has not yet fully penetrated into the furnace to provide for good insulation of the electric arc.

The use of burners for melting scrap at the furnace slag door during the early part of the melt down cycle is necessary to establish an empty space and a hot environment prior to the initiation of combined oxygen/carbon injection for the purpose of forming foamy slag as early as possible. If oxygen and carbon are injected through the slag door too early or without burner assistance, the injected carbon cannot reach and/or react with the iron-carbon melt due to the presence of the cold scrap at the slag door. Under cold conditions, injected carbon primarily reacts with injected oxygen, forming CO, which then is exhausted from the furnace. This creates a negative environmental impact instead of participating in the formation of foamy slag and in the reduction of FeO.

The firing of a movable burner at the slag door prior to the introduction of movable lance or lances into the furnace helps to melt scrap at the door, which allows more efficient use of carbon and oxygen injection by the door lances. However, rapid scrap melting at the slag door area also results in a very significant increase in the flow of ambient air infiltrating into the furnace. An increased volume of infiltrated air leads to an increase in nitrogen oxides ($NO_x$) being generated inside the hot spots formed by the electric arc at a time before foamy slag has been formed to submerge the arc and protect the extremely high temperature arc region from contact with infiltrated air.

Therefore, a need exists for a method and apparatus to generate foamy slag in the electric arc furnace through the use of localized solid carbon and oxygen injection while simultaneously minimizing ambient air infiltration through the slag door.

The basic (as opposed to acidic) slag forming material(s), such as burnt lime, dolomitic lime, etc., are typically charged with the scrap or injected through an opening in the furnace wall. These materials are not well distributed and dissolved in the slag located at the areas affected by the burners that have created empty space by melting a part of the scrap. To improve metallurgical characteristics of the slag being formed during the initial stage of scrap melting at the areas located near the burners, it is preferable to provide a method and apparatus for localized introduction of basic slag forming material at or near these areas. An empty space formed after the scrap has partially melted by the burners provides suitable conditions for localized injection of basic slag forming material, which improves foamy slag formation and permits earlier initiation of iron-carbon desulphurizing and dephosphorizing processes. Therefore, there is a need for a method and apparatus for localized introduction of basic slag forming material at these spots, assisted by the burners.

The oxidizing reactions between solid carbon and oxygen and/or solid carbon and molten oxides generates CO, which is partially oxidized to $CO_2$ when mixed with oxygen at high temperature conditions inside the furnace. When this reaction occurs under conditions permitting the heat released by the post-combustion of CO to be efficiently transferred to the scrap to be melted or to the iron-carbon melt, the furnace throughput capacity and thermal efficiency is increased. Therefore, a need exists to provide for localized post-combustion of CO with oxidizing gas which is introduced in areas where the CO concentration is substantially higher than the average CO concentration in the furnace exhaust gases.

During the EAF operation, a substantial volume of the slag is accumulated on the side walls which provides an insulating layer that protects the wall surface from being overheated by the arc. Keeping slag on the furnace side walls is especially beneficial for the panels located at the hot spots of the furnace. This desirable build-up of slag on the furnace side walls makes it necessary to use movable burners and devices for oxygen and solid material injection that are designed to operate through the open slag door and/or through the openings located in the EAF roof or in the top part of the side panel. The location of these openings avoids the problem of openings plugging with the slag, since only a limited volume of slag is splashed in the vicinity of these locations. When movable burners or lances are used, they are located in areas visible from the operating room so that the furnace operator can observe the movement of the devices. Unfortunately, this limits the use of the devices and increase the cost of the installation. During the last several years, new burners have been introduced that can be permanently installed in the lower part of the side panel and near the slag line and that are capable of protecting themselves from plugging with slag. This has significantly improved the performance of the burners and led to an increase in the number of burners utilized in the furnaces. The presence of multiple burners located at multiple points in the EAF side walls close to the slag layers and iron-carbon melt can potentially be used to expand the burner functions such as for carbonaceous fuel injection combined with oxygen injection for foamy slag formation, iron-carbon melt refining, and CO post-combustion purposes.

Therefore, there is a need for a method and apparatus for combined oxygen and carbonaceous fuel injection that can be permanently installed in the water-cooled panel of an EAF, preferably close to the slag line, and for such an apparatus to operate without movement and without the use of expensive moving mechanisms.

The increased use of solid carbonaceous fuel and oxygen in electric arc furnaces and the use of steel scrap containing plastic, paint, oil and other carbon bearing materials has led to an increase in carbon monoxide and hazardous hydrocarbon generated during the scrap melting cycle of the electric arc steelmaking operation. At the same time, in order to produce high quality steel and to minimize metallic impurities input from scrap, electric arc furnace shops have increased utilization of solid pig iron, iron scrap, direct reduced iron, iron carbide and other ferrous materials having high carbon content. After these ferrous materials are melted down, the melt is refined to oxidize carbon and other impurities in the iron-carbon melt. This oxidation of carbon generates hot CO emission from the molten bath.

Modern electric arc furnaces are equipped with a means to post-combust CO in the furnace exhaust gases by the use of ambient air inspirated through the break-flange connecting the electric arc furnace with the air pollution control system and by the use of a combustion chamber located downstream of the electric arc furnace. This combustion chamber is designed to provide additional residence time and the mixing needed for the reaction of CO with ambient air which has been inspirated upstream of the combustion chamber but downstream of the furnace break-flange.

To reduce the levels of CO and hazardous hydrocarbon to environmentally desired levels, the post-combustion of CO should be performed within and downstream of the electric arc furnace. Post-combustion of CO in the electric arc furnace is most beneficial when the heat released by oxidation of CO to $CO_2$ is efficiently transferred to the scrap and to the iron-carbon melt. This results in reduced electrical energy consumption and/or in an increase in the furnace production rate.

During the initial, cold phase of the scrap melting cycle, the scrap pile located at the slag door blocks ambient air infiltration into the furnace and therefore into the areas where the heat is added by the arc and by the auxiliary burners (when burners are used to add auxiliary heat to the scrap melting process). The lack of oxygen in high temperature spots where initial CO and hazardous hydrocarbons are formed (by volatilizing and incomplete combustion of charged hydrocarbons and carbon containing materials) prevents oxidation to $CO_2$ of the hot CO generated in these spots. This formed CO is exhausted away from the furnace by the suction created at the break-flange of the exhaust elbow of the furnace by an exhaust fan of the air pollution control system. CO, unburned hydrocarbons, and oxygen contained in infiltrated air mix and partially react in the narrow conduit formed by the exhaust elbow located downstream the furnace and upstream of the break-flange. However, due to the low temperature of exhaust gases during the initial cold phase of scrap melting and very short retention time, substantial quantities of CO and unburned hydrocarbons survive exhaust elbow mixing and arrive at the break-flange of the electric arc furnace. The break-flange is used to connect the furnace exhaust elbow and the exhaust duct and comprises an inspirating gap which provides for inspiration of additional secondary ambient air into the exhaust gases evacuated from the furnace. This additional inspirated air is mixed with cold exhaust gases during the initial cold phase of scrap melting which further reduces the exhaust gas temperature. This colder exhaust then travels into the combustion chamber which provides for additional mixing and retention time. Unfortunately, this additional retention time cannot ensure completion of CO post-combustion in the low temperature exhaust gases prior to flue gas emission into the atmosphere. Therefore, it is desirable to raise the temperature of the exhaust gases reaching the combustion chamber by reducing the inspirating gap during the initial stage of scrap melting and/or by the firing of additional burners into the combustion chamber to raise the flue gas temperature to insure ignition of the CO and unburned hydrocarbons.

During the hot phase of melt refining, a substantial amount of CO is emitted from the bath. A substantial amount of CO is also emitted from the slag containing carbon, especially when foamy slag practice is used in the electric arc furnace using solid carbonaceous particles injection. During these periods of increased CO emissions, it is advisable to maximize the amount of ambient air inspirated at the break-flange. However, this maximum amount of ambient air can periodically be insufficient to provide adequate oxygen to complete CO oxidation during peaks of CO emissions. Therefore, a need exists to provide for additional injection of an oxidizing gas into the furnace and/or into the combustion chamber downstream of the electric arc furnace to post-combust CO generated during the hot phase of the steelmaking process.

The known methods of electric arc furnace steelmaking use the slag door to introduce multiple movable lances for the injection into the process of oxygen and solid carbonaceous particles as well as for the introduction of a burner flame to melt the scrap near the slag door. Also known is the injection and/or batch charging of basic slag forming materials and slag enhancers through the slag door and the injection of additional oxygen via a movable oxygen injecting lance through the slag door for the purpose of CO post-combustion. All the above technologies use multiple manual and/or automated movable lances that are moved into the furnace and removed during the steelmaking cycle.

The slag door of the furnace is the most accessible opening in the electric arc furnace for the introduction of movable lance(s) and burning means. Known apparatuses for carbon injection, lime injection and oxygen injection comprise multiple, separately movable water-cooled lances and/or consumable pipe-lances that are submerged into the melt. The burner(s) and the multiple lances are introduced utilizing multiple movement mechanisms through the slag door during different periods of the steelmaking cycle to provide for various steelmaking process inputs. The use of multiple lances and/or burner(s) makes it difficult and expensive to carry out automatic and simultaneous introduction of the flame, oxygen, carbon and basic slag forming material through the slag door.

Therefore, there is a need for combining the burner means, a carbon injection means, an oxygen injection means and, optionally, a basic slag forming material injection means integrated via movable water-cooled lances that efficiently operate through the slag door during the entire steelmaking process.

When ambient air infiltrated in the furnace passes through the hot spots located near the arc or mixes with the high temperature flames generated by oxy-fuel burners, the nitrogen and oxygen of the air react under such conditions to form nitrogen oxides ($NO_x$), primarily comprised of NO. NO further partially reacts with CO, volatilized hydrocarbons and soot particles so that the total amount of NO is reduced before the exhaust gases leave the electric arc furnace. When the exhaust gases pass through the combustion chamber during the hot phase of the steelmaking cycle, the reaction between nitrogen and oxygen can be triggered at the hot spots created by the hot flames or by streams of highly concentrated oxidizing gas injected for the purpose of CO post-combustion inside the combustion chamber interior. This may, however, increase $NO_x$ emissions. Therefore, a need exists to minimize NO emission from electric arc furnaces while using high temperature flames and/or oxygen injection in the furnace and in the furnace combustion chamber.

When lumps of basic slag forming material such as burnt lime, dolomite lime, raw dolomite, lime stone, etc., are charged, these materials should be well distributed inside the furnace. Good distribution of lump carbonaceous fuel such as anthracite, coke, etc., is also important to ensure good performance of charged materials. Unfortunately, apparatuses currently available cannot accomplish the efficient introduction and good distribution of the materials during the desired period of the steelmaking cycle. This results in an incremental use of basic slag forming material, and a corresponding increase in electrical energy usage due to the additional energy required to melt the injected basic slag forming material. This also results in incremental use of solid carbonaceous materials which are used with low efficiency, but cause additional sulfur and nitrogen input to the slag and, therefore, to the melt. The use of solid carbonaceous material also increases CO emissions due to oxidation of the injected solid carbonaceous fuel material.

Therefore, a need exists for a method and apparatus for the introduction of lump carbonaceous fuel and basic slag forming materials and for allowing good distribution of these materials inside of the slag, thereby reducing their consumption, the sulfur and nitrogen content of the melt, and the amount of electrical energy used per ton of steel produced.

The continuous increase in electric arc steelmaking process productivity has been achieved in modern furnaces by the use of more powerful arcs and by the use of additional heat sources. This increase has led to the reduction in tap-to-tap time and, therefore, the time period available for the use of burners and movable lances, especially slag door lances.

Therefore, there is also a need for a method and apparatus allowing for rapid scrap melting near the slag door area to provide for the earlier introduction of a movable injecting burner into the furnace through the slag door.

SUMMARY OF INVENTION

The present invention relates to a burner/injector means for providing a localized impingement flame for scrap heating and melting through use of a fluid fuel and a highly oxidizing gas such as oxygen or a combination of oxygen and air. The burner/injector means includes a liquid-cooled combustor means for generating an impinging flame directed toward the scrap pile and a means for injecting solid carbonaceous fuel and a controllable flow of a high velocity oxidizing gas throughout the space previously occupied by the impinging flame or flames. Optionally, the burner/injector means has a means for injecting other solid fines including solid slag forming materials and/or a means for injecting an additional oxidizing gas for the post-combustion of CO generated by the reaction of injected carbon and/or oxygen.

The burner/injector means can contain one or more burners equipped with a combustor means for burning fluid fuel and a means for injecting oxidizing gas, solid carbonaceous fuel, solid slag forming material, deoxidizing and alloying materials, and/or EAF dust material. The flame (or flames) generated by each burner/injector means, each burner/injector means having a single or multiple liquid-cooled combustor means, is first directed toward a predetermined area of the furnace which is initially occupied by the charged scrap. After at least a part of the scrap previously located in this predetermined area is melted by the flame or flames formed by the combustor means, the burner/injector means initiates the step of high velocity oxidizing gas injection, preferably accompanied by solid carbonaceous material injection. Both oxidizing gas and carbonaceous material flows should preferably be directed toward the predetermined furnace area previously occupied by the scrap. Optionally, basic slag forming material, such as burnt lime, limestone, dolomitic lime, and raw dolomite, may be injected by the burner/injector means in approximately the same furnace region. Also, optionally, an additional stream of oxidizing gas may be injected by the burner/injector means toward approximately the same furnace region to participate in the post-combustion of CO formed by the oxidation of the injected carbon by the injected oxidizing gas and/or the metallic oxides that were charged with the scrap or that were formed during the previous scrap melting step.

The burner/injector means may be arranged as a simple liquid-cooled combustor permanently mounted through the furnace wall or roof. Each combustor may be equipped with single or multiple channels for solid material injection. The burner/injector means may comprise one or more additional combustors equipped with a single or multiple channels for injection of solid material(s). Optionally, the burner/injector means may comprise one or more combustors operating in conjunction with each other and/or with a separate liquid-cooled injecting lance or lances which provides solid material(s) and/or oxidizing gas injection. Combustors and separate injecting lances included in the burner/injector means are preferably permanently mounted through the furnace wall or the roof. Optionally, the combustors and/or the liquid-cooled oxidizing gas lance or lances may be equipped with a nozzle or multiple nozzles for additional injection of post-combustion oxygen. An additional, separate oxidizing gas injecting lance can be used to introduce an additional post-combustion oxygen stream toward the predetermined area to react with CO generated by the oxidation of the injected solid carbonaceous fuel.

The means for solid particle material and oxidizing gas injection may preferably be designed as a single or multiple channels located inside or attached to the liquid-cooled body of the combustor. The channels are preferably arranged to inject solids so that the flame discharge opening of the liquid-cooled combustion chamber initially used to shape the high velocity melting flame can later be used as an opening for directing single or multiple streams of injected materials into the furnace. The combustion chamber, in other words, provides a conduit for introduction of injected material or materials into the furnace. At the same time, the combustion chamber is used to generate the flame that protects the flame discharge opening of the combustion chamber from plugging with splashed slag or metal as well as from plugging the outlet openings in the burner/injector means used to discharge solid material or materials.

This invention also relates to a method of melting and refining of metals by high temperature impinging combustion products generated by a single or multiple oxy-fuel or fuel/oxygen/air combustors that first directs the flame toward a predetermined area of the scrap to be melted. Once a substantial portion of charged scrap contacted by the flame(s) becomes molten, an injection of solid carbonaceous fuel is preferably initiated through the combustion chamber of at least one of the combustors. In a preferred embodiment, high velocity (preferably supersonic) oxygen is directed, preferably simultaneously with solid carbonaceous material, through at least one dedicated nozzle toward the injected solid carbonaceous fuel to mix with this fuel to generate CO capable of forming foamy slag. This solid carbonaceous material and high velocity oxygen may, alternatively, be injected periodically rather than simultaneously.

The flow of injected oxidizing gas may be directed through a dedicated nozzle for oxidizing gas injection in the combustor which performs simultaneous carbonaceous fuel injection, through a nozzle of another combustor that has previously fired toward the same predetermined furnace area, and/or through the nozzle of an oxidizing gas lance device external to the combustors which is also directed toward the predetermined area.

Optionally, solid carbonaceous fuel injection and/or oxidizing gas injection is performed with the injection of lime or other slag forming material directed toward approximately the same predetermined area.

Optionally, an additional stream of post-combustion oxidizing gas is injected toward the CO generated by the oxidation of the injected carbon and oxygen by the same burner or by additional burners (firing toward approximately the same scrap region), or by a dedicated lance for injection of post-combustion oxygen.

The above-described injection of solid carbonaceous material, solid slag forming material, electric arc furnace dust, and/or other solid particles, all of which can benefit the steelmaking process, may be accomplished through the burner/injector means. This injection of solid particles can occur through a flame envelope created by simultaneous burning a flow of fluid hydrocarbon fuel with one or more oxidizing gases having the same or different oxygen content from the burner/injector means.

It is thus an object of this invention to provide a burner/injector means which permits the efficient preheating and partial melting of scrap with an oxy-fuel or fuel/oxygen/air flame at an early stage of the melting cycle by firing impinging flame(s) to preheat and partially melt the scrap and further to direct through the combustion chamber of the burners a high velocity stream of highly concentrated oxidizer to ignite and burn a small portion of the preheated scrap.

It is a further object of this invention to provide a burner/injector means that permits the introduction of solid carbonaceous fuel toward the iron-carbon melt throughout an empty volume, which was previously occupied by scrap at the beginning of the melting cycle, after at least a portion of the scrap located in front of the combustor outlet of the burner/injector means has been melted down.

It is also an object of this invention to provide a burner/injector means that permits (after at least a part of the scrap located in front of the combustor outlet of the burner/injector means has been melted down) the introduction of high velocity oxidizing gas directed toward the iron-carbon melt to mix with batch charged or the injected solid carbonaceous fuel in order to initiate the oxidation reaction, thereby generating carbon monoxide and, optionally, partially post-combusting this carbon monoxide generating carbon dioxide.

It is a still further object of this invention to provide a burner/injector means that permits (after at least a part of the scrap located in front of the combustor means of the burner/injector means has been melted down) the injection of a basic slag forming material throughout the empty volume previously occupied by the scrap so that mixing of the injected slag forming material with slag that has been formed at least partially occurs.

It is also an object of the invention to provide a method and apparatus for electric arc steelmaking to introduce through the furnace slag door a high velocity hydrocarbon fluid fuel flame, oxygen-rich oxidizing gas, solid carbonaceous fuel and, optionally, basic slag forming material to assist the steelmaking process. The method and apparatus can optionally provide for post-combustion of CO and hazardous hydrocarbons emitted from the steelmaking process. The post-combustion optionally occurs first inside of the furnace interior and/or downstream of the furnace exhaust elbow by using a combination of inspirated ambient air and an additional flow of injected oxygen-rich oxidizing gas introduced by multiple side wall burners that are also used for melting of the scrap pile located near the electric arc furnace walls by using a hydrocarbon fuel and an oxygen-rich oxidizing gas having an average oxygen content in excess of 30%.

It is a further object to provide a liquid-cooled, movable burner/injector means used through the slag door to melt the scrap pile located near the slag door and, optionally, to inject solid carbonaceous fuel. The method of steelmaking may further comprise a step of injecting multiple oxidizing gases toward multiple regions of the furnace interior which have been affected by the solid carbonaceous fuel injection, and an optional step of introducing basic slag forming material through the movable burner/injector means and/or at least one of the burner means. The method preferably includes a step of injecting a post-combustion oxidizing gas through at least one of the burner/injector means to partially oxidize CO generated by the reaction of the injected carbonaceous fuel and oxidizing gas. In addition to the flows of post-combustion oxidizing gas being delivered toward different zones of the furnace interior, the method can also include a step of injecting a controlled amount of an extra oxidizing gas into exhaust gases downstream the furnace. The flow of the extra oxidizing gas is controlled by the process control system and is based on the combination of process parameters actively measured and/or controlled by the process control system. At least some of the process parameters influencing CO generation and subsequent emission from the furnace and are used to establish the deficiency of oxygen in the exhaust gases and the controllable flow of extra oxygen which is needed for post-combustion downstream of the furnace in anticipation of the desirable level of CO emission. The process parameters monitored may include the electrical energy introduced by electrodes, the flow of hydrocarbon fuel introduced by the burners, the mass of charged and/or injected solid carbonaceous fuel, the total amount of oxygen used, the furnace pressure, and exhaust gas characteristics, including the temperature of exhaust gases, the content of oxygen and/or CO in exhaust gases and other characteristics of the exhaust gases correlating to the level of hazardous emissions being discharged into the environment from the electric arc steelmaking process.

It is a further object of this invention to provide a burner/injector means which is movable via remote control through the furnace opening and which is capable of generating a high temperature flame utilizing fluid hydrocarbon fuel and a first oxygen rich oxidizing gas (preferably industrial produced oxygen) for preheating and partially melting the scrap located in front of the burner/injector means. This invention is further capable of increasing the flame temperature and radiative heat flux from the luminous flame core created by the combustion of solid particles of carbonaceous material introduced inside the high temperature flame core with the flow of a high pressure carrier gas, such as compressed air, nitrogen, natural gas or other gas. Also, when compressed air is used, the carrier gas functions as an auxiliary oxidizing gas.

The burner/injector means is further capable of cutting heavy pieces of the preheated scrap with a high velocity first oxidizing gas stream and igniting a small portion of the light preheated scrap to speed the scrap melting process. This high velocity first oxidizing gas stream can surround the injected stream of solid carbonaceous material particles so that the injected fines are accelerated by the inspirating action of the higher velocity first oxidizing gas stream and simultaneously be at least partially burnt by reacting with the surrounding first oxidizing gas stream to generate an expanding volume of the hot combustion products. This further accelerates the flow of unburned carbonaceous particles by thermal expansion of the gases inside their travel passage surrounded by the high velocity first oxidizing gas streams which are expanding toward each other creating this surrounding high velocity oxidizing stream. The flow of fluid hydrocarbon fuel can then be greatly reduced or completely eliminated, allowing a portion of injected oxygen to participate in scrap cutting and burning and/or melt and slag oxidation. Also, part of injected carbonaceous material further participates in slag foaming.

An additional stream of high velocity, preferably supersonic refining oxygen, is optionally directed through an additional dedicated nozzle of the burner/injector means toward the furnace interior. The refining oxygen is angled down toward the furnace bottom. An operating end of the burner/injector can optionally move inside of the furnace interior changing the distance between the burner/injector operating end and the molten pool accumulating on the bottom of the furnace. This movement of the burner/injector means can optionally be carried out through a furnace opening, preferably the slag door opening. The movement of the burner/injector means can provide for changing of the impingement angle of injected solids, first oxidizing gas stream and stream of refining oxygen during burner/injector means operation to improve efficiency as a melting and refining apparatus.

This burner/injector means can be effectively utilized to reduce nitrogen content of steel, especially in the case of carbon steel grades, by maintaining a thick layer of foamy slag continuously near the hottest furnace spot created by electric arc in the center of the furnace away from the furnace walls. The foamy slag can be formed in this area through initiating the use of high pressure carbon dioxide ($CO_2$) or natural gas instead of compressed air or other compressed gas used as a carrier gas and by substituting the high velocity first oxidizing gas stream with a high velocity $CO_2$ stream capable of shielding the flow of injected fines of carbon or other slag deoxidizers, including ferroalloys, basic slag forming material, or a mixture thereof. As a result, the delivery range of the injected particles is enhanced, oxidation of the injected particles, electrodes, slag and iron-carbon melt with injected gases is substantially reduced, good foamy slag can be maintained around the electrode(s), and, optionally, the iron-carbon melt carburizing and deoxidation of the slag and the iron-carbon melt can be effectively carried out.

It is also desirable to introduce additional post-combustion oxidizing gas streams to the areas of the furnace that are primarily responsible for CO and volatile hydrocarbon emissions during the initial cold phase of the scrap melting process. This introduction of post-combustion oxidizing gas would provide for additional oxidation of hydrocarbons and CO near the areas where CO and volatilized hydrocarbon are present at higher concentrations. To prevent oxidation of the electrodes, a localized oxygen introduction should preferably be limited to the furnace interior zones adjacent to the burners located on the side walls and through the slag door.

Optionally, when electrodes are not used during the initial scrap preheating cycle in the furnace interior, the additional movable burner or burners can be temporarily positioned to fire through hole(s) in the furnace roof which are used for introduction of the electrode(s) into the furnace. In this case, additional burners may operate through the furnace side walls and/or roof to provide additional heat and hot combustion products input. These combustion products can preferably include a substantial amount of excess oxygen. This excess oxygen present in the hot combustion products is preferably directed to mix with CO and volatilized hydrocarbons to improve CO post-combustion inside the electric arc furnace interior. To further reduce the CO content in the exhaust gases during the colder part of the steelmaking cycle, post-combustion burners and oxidizing gas lances may be installed to operate in the combustion chamber located downstream the furnace exhaust elbow to raise the temperature of the exhaust gases and to accelerate the oxidation of CO and hazardous hydrocarbons to allow the exhaust gases to react with oxygen inside the combustion chamber.

DESCRIPTION OF PREFERRED EMBODIMENT

Preferred embodiments of the invention are now described with reference to the drawings, in which like numbers indicate like parts throughout the views.

Figure 1:
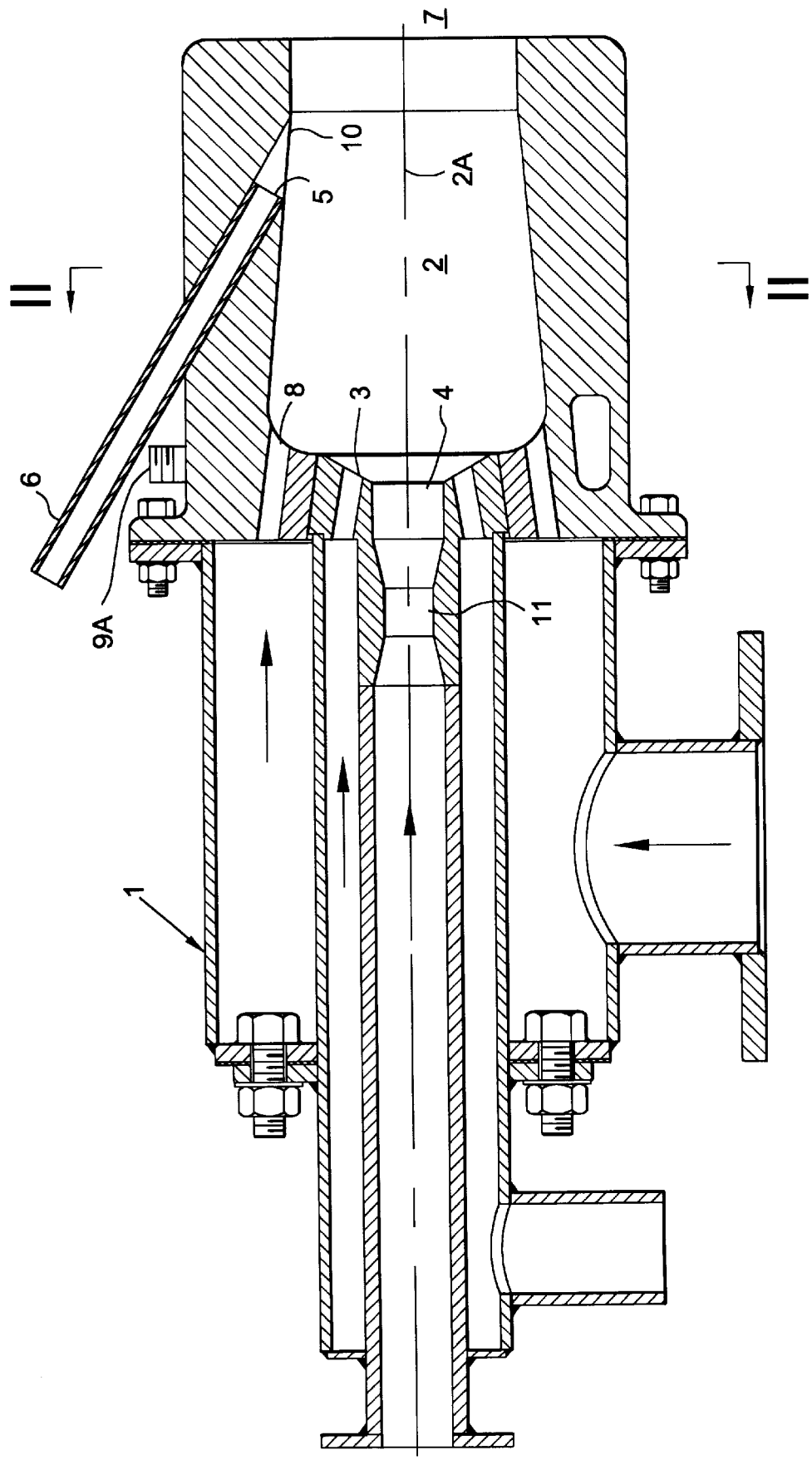
FIG. 1 shows a side cross-sectional view through the center of a first embodiment of a combustor of a burner/injector means in accordance with the invention equipped with a means for injection of solid particles.

FIG. 1 shows a first embodiment of the inventive burner/injector means having a liquid-cooled body including a combustor means 1, equipped with a liquid-cooled combustion chamber 2 (which is also known as a "combustion chamber"), a first outlet nozzle 4, preferably having the converging-diverging shape 11 of a Laval nozzle for introduction of a first oxidizing gas into the combustion chamber 2 for the purpose of hydrocarbon fuel combustion and high velocity (preferably supersonic) oxygen injection into the furnace through the combustion chamber, at least one second outlet nozzle 3 for introduction of fluid hydrocarbon fuel into the combustion chamber and at least one third supply conduit 5 for introduction of solid material particles carried by a flow of a compressed carrier gas into the combustion chamber 2 through a replaceable pipe 6 having a third outlet opening 10 adjacent to and directed toward the flame discharge opening 7 of the combustion chamber. The flame discharge opening 7 (which is also known as a discharge flame outlet opening) preferably is circular. The present invention also can include a flow controlling means, for controlling the flows of the gases and introduction of solid material particles.

The first outlet nozzle 4 directs the first oxidizing gas in a direction along a central axis 2A of the combustion chamber 2. The second outlet nozzle 3 directs the hydrocarbon fuel about and toward the central axis. That is, the hydrocarbon fuel at least partially surrounds the central axis 2A and is directed toward the first oxidizing gas inside of the combustion chamber 2 to create an ignitable mixture which forms a high temperature flame which discharges with a high velocity through the flame discharge opening 7.

The dimensions of the combustion chamber 2, the first outlet nozzle 4, the second outlet nozzle 3, the third outlet opening 10, and the flame discharge opening 7 are arranged to allow the flows of the first oxidizing gas, the hydrocarbon fuel, and the compressed carrier gas to be maintained by the flow controlling means under a pressure sufficient to create a small hot pilot flame capable of producing hot initial combustion products having a sufficiently high velocity for protecting the first and second outlet nozzles, the third outlet opening, and the flame discharge opening of the combustion chamber from plugging with slag in the furnace when the flame discharging opening of the combustion chamber is submerged into slag.

The solid particles that can be injected via the burner/injector means through the third supply conduit 5 preferably include carbon bearing materials, steel deoxidizing materials, ferroalloys, basic slag forming materials, electric arc furnace dust, direct reduced iron ("DRI"), iron carbide, or a mixture thereof The third outlet opening 10 preferably is arranged to direct the carrier gas and the carried solid particles through the flame discharge opening 7 and into the furnace, preferably at least partially mixing, when used, with the first oxidizing gas and, when used, the hydrocarbon fuel.

In addition, multiple openings 8 are provided for introduction of an optional second oxidizing gas. The second oxidizing gas can have the same oxygen content as the first oxidizing gas or, preferably, has a lower oxygen content. For example, the first oxidizing gas can preferably be an industrially produced oxygen (above 90% $O_2$) and the second oxidizing gas can be air or oxygen enriched air. Also, the first or the second oxidizing gas can be comprised of two different oxidizing gases having different oxygen concentrations. The second oxidizing gas preferably has an average oxygen content between 20% and 50%. The second oxidizing gas can at least participate partially in the burning of the hydrocarbon fuel during at least a part of burner firing cycle, thereby reducing the flame temperature. To provide for rapid ferrous scrap melting, the average adiabatic temperature of the flame should be maintained preferably above 4000° F. To do so using hydrocarbon fuel, it is advisable to maintain the average concentration of oxygen in the first or the combined first and second oxidizing gases above 30% during the scrap melting cycle.

When the burner/injector means operates in the fuel burning mode, a controllable flow of fluid hydrocarbon fuel is directed through the second outlet nozzles 3 into the combustion chamber 2, and controllable flows of a first and, optionally, second oxidizing gases are directed through the respective openings 4, 8 into the combustion chamber to participate in the combustion of the hydrocarbon fuel and to create a scrap heating and melting flame directed through the flame discharge opening 7 toward the scrap to be melted. When a small portion of the scrap pile located at the front of the flame discharge opening 7 is melted down and a larger portion of the scrap located around the flame discharge opening 7 is preheated to a temperature above at least 1400° F., and preferably above 1800° F., the flow of the fluid hydrocarbon fuel is reduced, and the flow of oxygen is optionally increased to create a highly oxidizing flame that rapidly reacts with preheated scrap located in front of the flame discharge opening 7. The heat released by exothermic oxidation melts an additional portion of the scrap pile located near the discharge from the flame discharge opening.

Then, optionally, the flow of fluid fuel is further reduced or completely eliminated, the flow of the secondary oxidizing gas (when available) is also reduced or completely eliminated, and the flow of the first oxidizing gas is substantially increased providing for injection into the furnace, through the first outlet nozzle 4 of a high velocity oxidizing gas, preferably at a supersonic velocity. The pressure of the first oxidizing gas should be substantially above the critical pressure value to maintain the velocity of the first oxidizing gas exiting the first outlet nozzle 4 above supersonic velocity. The increased velocity of the first oxidizing gas allows an additional portion of preheated scrap located further away from the flame discharge opening 7 to contact the high velocity oxidizing stream, resulting in rapid cutting, burning, and melting of additional scrap from heat released by the oxidation reaction between injected oxygen and the additional portion of the preheated scrap. To provide for effective performance of the high velocity oxidizing gas, the oxygen content of the oxidizing gas should be kept above 90%.

The initially melted scrap creates an iron-carbon melt that accumulates on the bottom of the furnace. In instances where a portion of the previously produced heat is not discharged from the furnace and is kept as a heel, the newly formed iron-carbon melt is mixed with the molten metal of the heel creating an additional mass of iron-carbon melt. Slag forms on top of the iron-carbon melt.

Figure 2:
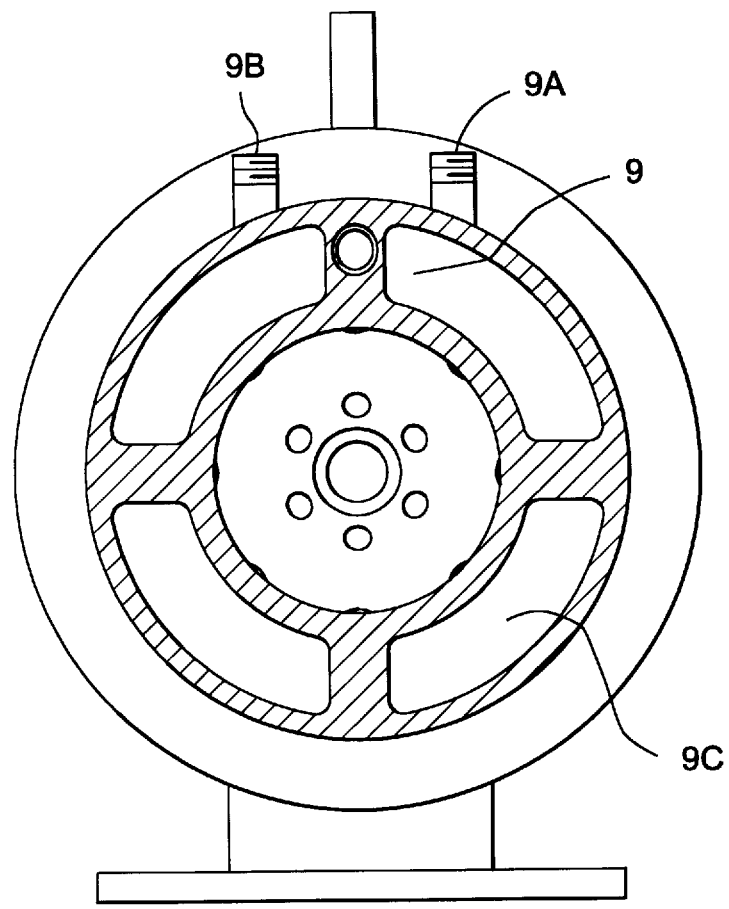
FIG. 2 shows a rear cross-sectional view of the combustor of FIG. 1, taken along line II—II of FIG. 1.

During the operating cycle of the burner/injector means in the fuel burning mode, the compressed carrier gas, which is later used during the solid particle injection step as a carrier of the particles, is preferably bled through the consumable pipe 6 to prevent flame and oxidizing gas flow penetration into the pipe 6. The flow of bled compressed gas also cools the pipe 6 installed into the combustor body, which is preferably made of copper. Nitrogen, compressed air, natural gas, carbon dioxide, or a mixture thereof may be used as the compressed gas carrying the solid particles, which may include solid carbonaceous fuel. The pipe 6 is primarily cooled by the direct contact with the water-cooled copper rib 9, as shown in FIG. 2. A water inlet 9A and water outlet 9B are used to maintain a flow of water for continuous cooling and heat removal in chamber 9C. The chambers 9C are also the means of cooling the combustion chamber 2.

Optionally, particles of solid carbonaceous fuel are injected to participate, together with fluid hydrocarbon fuel, in the formation of the high temperature bright melting flame during the fuel burning mode which radiates heat. Also, optionally, the particles of basic slag forming material (which may optionally be mixed with solid carbonaceous fuel) can be injected through pipe 6 preferably after the fuel burning step or during and after high velocity oxidizing gas injection step.

Later, when at least a part of the scrap located in front of the flame discharge opening 7 is melted down and the iron-carbon melt is created near the combustor location together with an empty space which is suitable for injection of solid particles, a combined injection mode can be initiated. If the burner/injector means comprises two separate combustors (e.g., illustrated in FIG. 8 as 342 and 343), both could participate in the combined particles and oxidizing gas injection step. During the combined injection step, both combustors will preferably eliminate or reduce significantly (more than two (2) times and more preferably more than five (5) times and even more preferably more than eight (8) times) the flow of hydrocarbon fuel which was previously maintained during the operation of the burner/injector means in the fuel burning step for scrap melting purpose. The flows of the first oxidizing gas of a first combustor is also eliminated or significantly reduced, preferably to less than one-fifth, the flows maintained during the scrap melting cycle. The elimination or reduction in the optionally used second oxidizing gas of both combustors is also preferred during the solid particle injection step of the burner/injector operation. The primary reasons for the reduced flow instead of elimination of the above gases during the particle injection step are to prevent the accumulation of solid particles inside of the combustion chamber 2 and to prevent solid particles or compressed gas penetration throughout the openings and nozzles 3, 4, 8 and into the burner/injector body and upstream piping.

The flow of the solid carbonaceous fuel and/or solid basic slag forming material and the flows of compressed carrier gas are supplied during the particle injection step through pipe 6 of the first combustor and further through the flame discharge opening 7 toward a predetermined area of the furnace. Approximately simultaneously, the flow of the high velocity first oxidizing gas, having an average oxygen content in excess of about 50% (preferably industrial produced oxygen with oxygen content exceeding 90%), is directed toward the same predetermined area through opening 4 of a second combustor means 1 of the burner/injector means. The high velocity oxygen stream is directed preferably with supersonic velocity to contact at least a part of carbonaceous material being injected as described above via the first combustor means to form CO which foams the slag formed or being generated at the predetermined furnace area. A part of the oxygen stream will penetrate through the foamy slag and react with iron-carbon melt for refining purposes. A part of the injected carbonaceous fuel will react with iron oxides in the slag, forming CO and metallic iron. This will improve the metallic yield of the steelmaking process.

Figure 3:
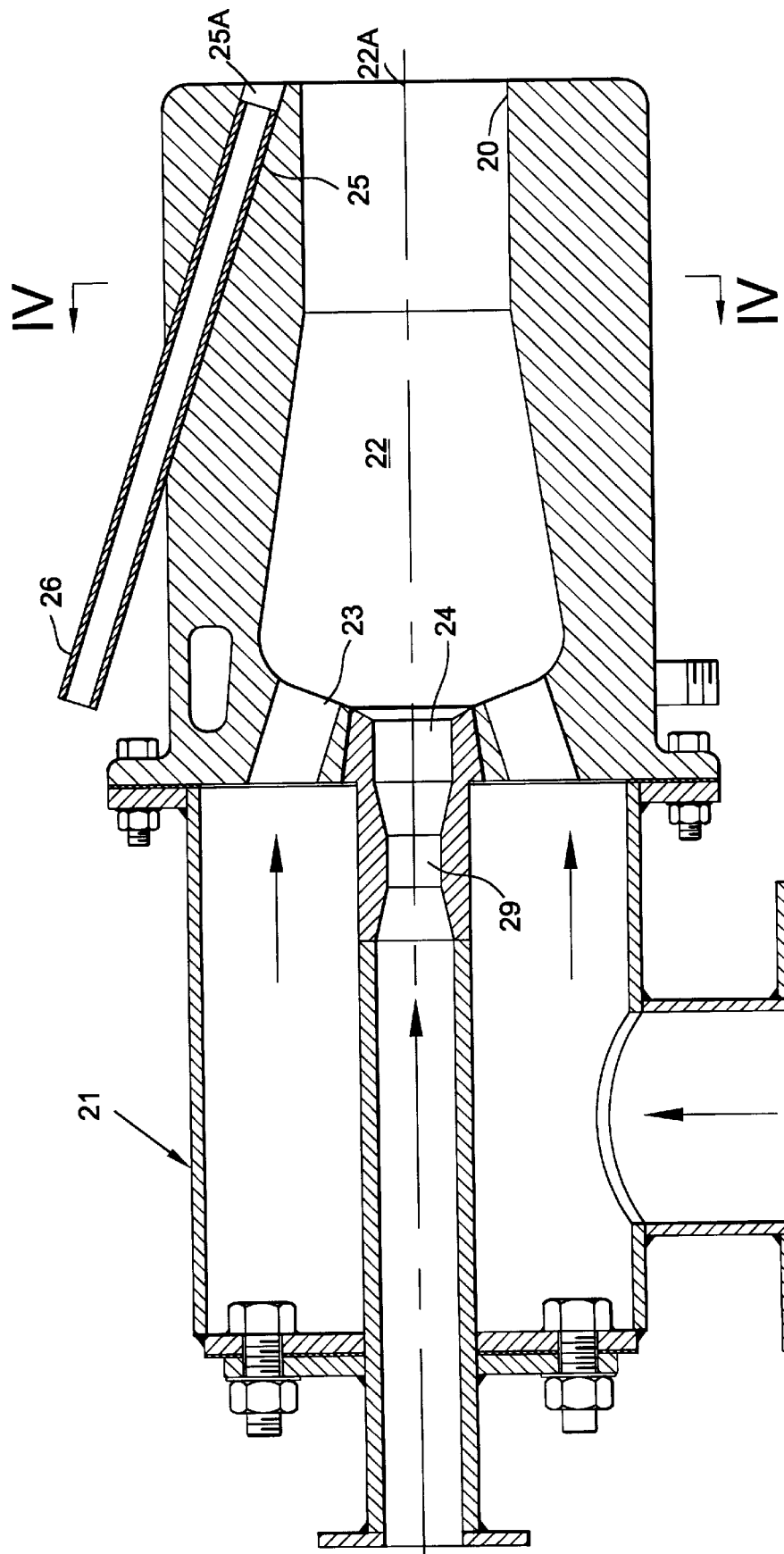
FIG. 3 shows a side cross-sectional view through the center of a second embodiment of a combustor of a burner/injector means in accordance with the invention equipped with a means for injection of solid particles and an additional oxidizing gas.
Figure 4:
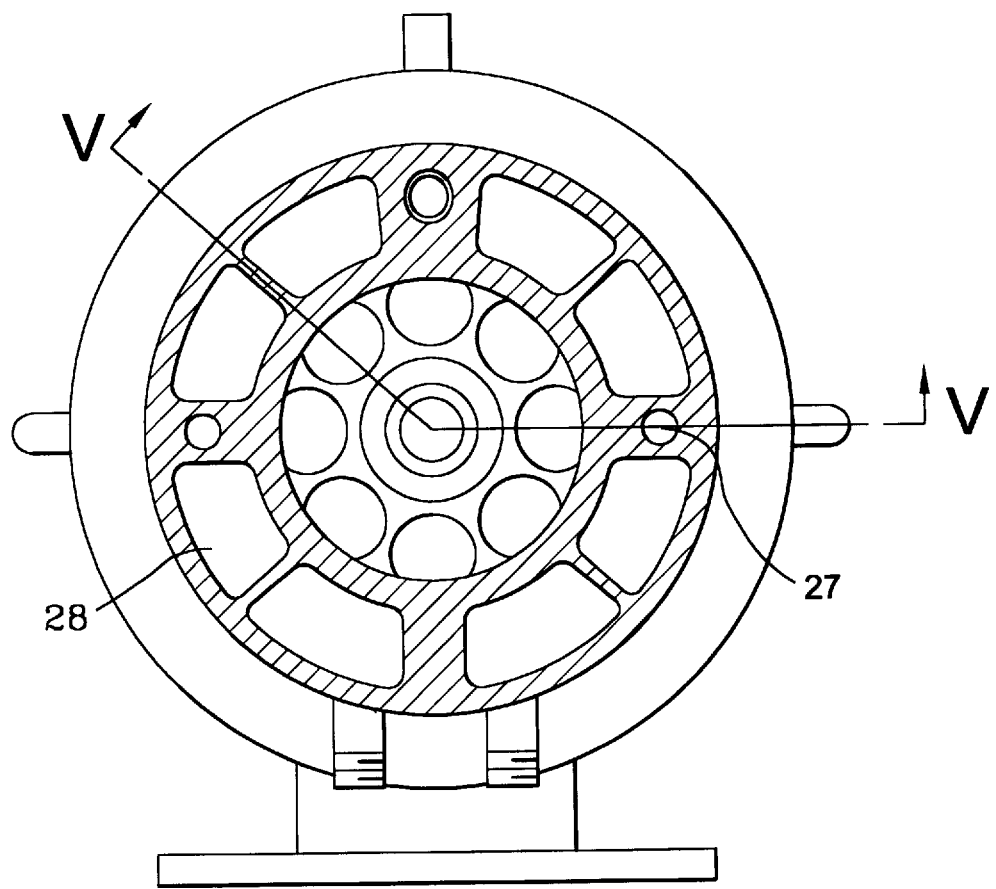
FIG. 4 shows a rear cross-sectional view of the combustor of FIG. 3, taken along Line IV—IV of FIG. 3.
Figure 5:
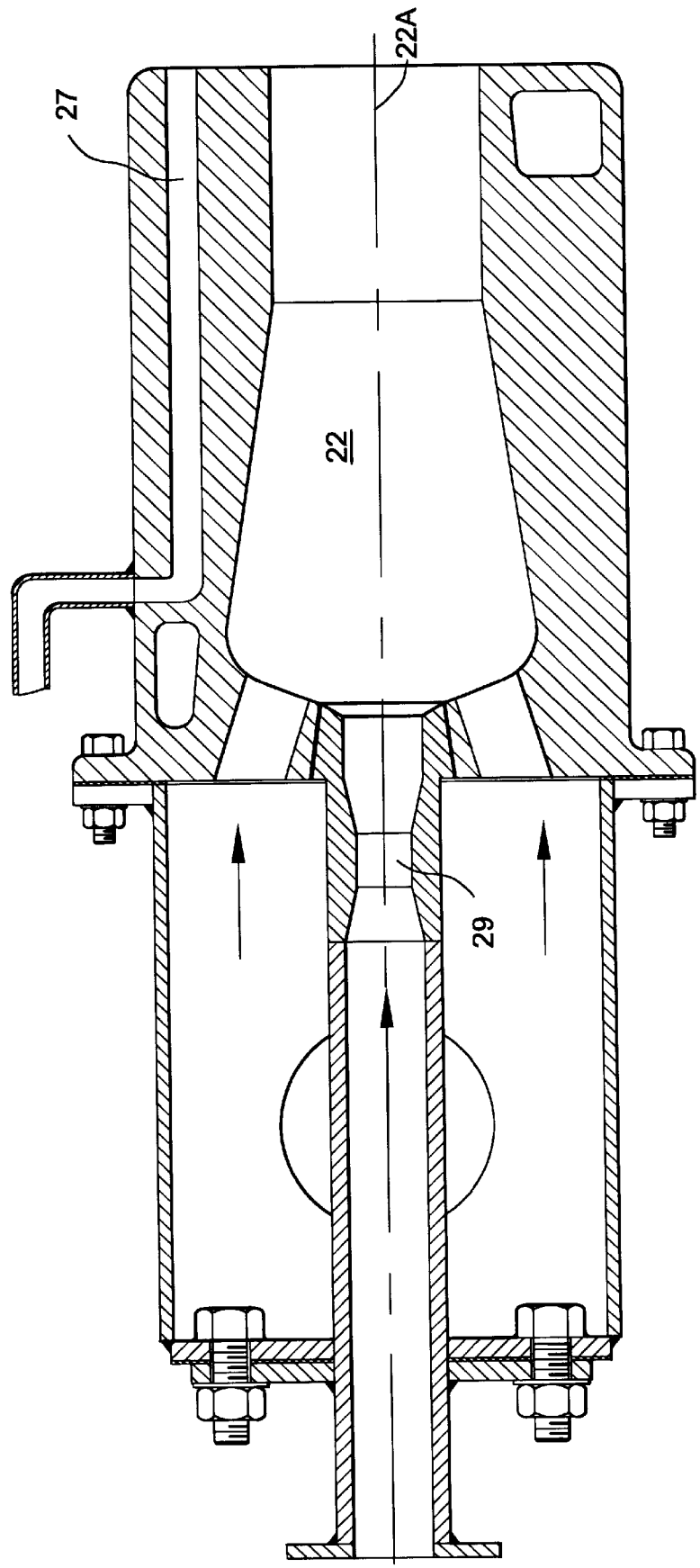
FIG. 5 shows a side cross-sectional view of the combustor of FIG. 3, taken along line V—V of FIG. 4.

The second embodiment of the invention shown in FIGS. 3, 4 and 5 relates to a burner/injector means having a liquid-cooled body equipped with combustor means 21 also comprising at least one channel for injection of at least one stream of an additional oxidizing gas. The combustor means 21 includes a liquid-cooled combustion chamber 22 having a flame discharge opening 20, multiple liquid chambers 28 for water cooling, a first outlet nozzle 24, preferably having the converging/diverging shape 29 of a Laval nozzle, for introduction of the first oxidizing gas into the combustion chamber 22 to create a flame for melting scrap and later to inject high velocity oxygen (preferably with supersonic velocity) for cutting and burning the preheated scrap, oxidizing the injected solid carbonaceous fuel and iron-carbon melt, and at least one second outlet nozzle 23 for the introduction of fluid hydrocarbon fuel into the combustion chamber 22. As with the first embodiment shown in FIGS. 1 and 2, the first outlet nozzle 24 and the second outlet nozzle 23 can have the same orientation relative to the central axis 22A of the combustion chamber 22 and similar relative dimensions, wherein a high velocity flame exits through the flame discharge opening 20.

The burner/injector means of the second embodiment can also be equipped with at least one additional supply conduit 27 for injecting an additional oxidizing gas, and at least one third supply conduit 25 for injecting solid material particles toward the furnace interior. The third supply conduit 25 for injecting of solid particles provides for solid particle injection through the inserted replaceable pipe 26, preferably made of a highly erosion-resistant material. The third outlet opening 25A is adjacent to the flame discharge opening 20 to direct the carrier gas and carried particles into the hot furnace interior, preferably entrained in the flame exiting through the flame discharge opening of the combustion chamber during part of the operating cycle of the burner/injector means. As distinguished from the third outlet opening in the first embodiment shown in FIG. 1, the third outlet opening 25A here is not disposed inside the combustion chamber 22.

The additional supply conduit 27, shown in FIGS. 4 and 5, permits injection of the additional oxidizing gas to oxidize injected solid carbonaceous material, oxidize the iron carbon melt, and/or post-combust CO. It is important to note that the second oxidizing gas described in the first embodiment participates in forming the flame and burning the fluid and solid fuels exiting the combustor means of the associated burner/injector means, whereas the additional oxidizing gas in this embodiment is used for the purposes of refining instead of participating in the flame for burning products exiting the burner/injector means. It should be understood that multiple conduits (not shown in the above FIGS. 1, 2, 3, 4, and 5) for injection of solid material particles similar to the channels 5, 25 shown in FIGS. 1 and 3 and multiple channels for the high velocity additional oxygen injection similar to channels 27 shown in FIG. 5 may be used by the combustors of burner/injection means utilizing one or two different oxidizing gases that are similar to the combustor embodiments shown in the first and second embodiments of the present invention. For example, an embodiment of the present invention can provide a second oxidizing gas and additional oxidizing gas as well as the first oxidizing gas, hydrocarbon fuel, carrier gas, and solid material particles.

It should also be understood that the additional supply conduit 27 used for injection of the additional oxidizing gas may have the outlet opening arranged as the converging/diverging profile of a Laval nozzle to provide for supersonic velocity of injected additional oxidizing gas.

It should be understood that multiple openings of the burner/injector means 1 and 21 introducing the hydrocarbon fuel and the first and second oxidizing gases can alternate positions and the burner/injector means will still be able to operate in accordance with this invention.

Figure 6:
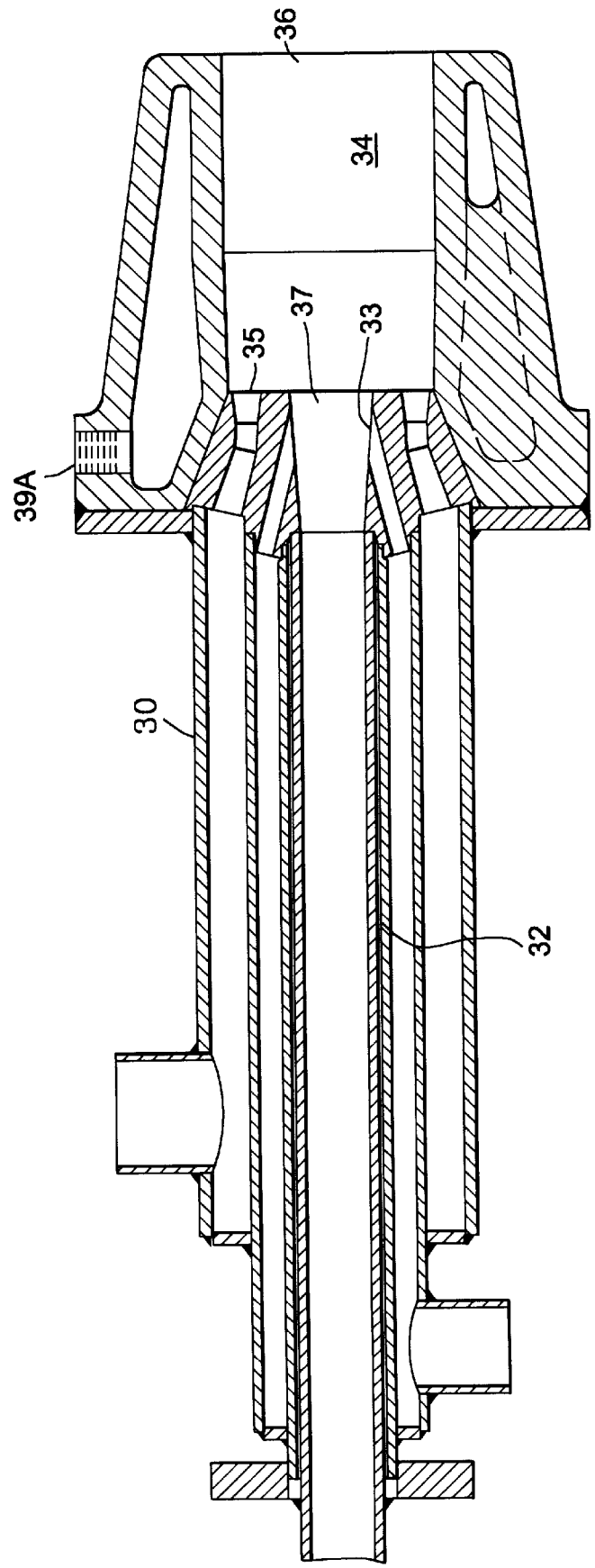
FIG. 6 shows a side cross-sectional view through the center of a third embodiment of the combustor of a burner/injector means in accordance with the invention equipped with a means for injection of solid particles.
Figure 7:
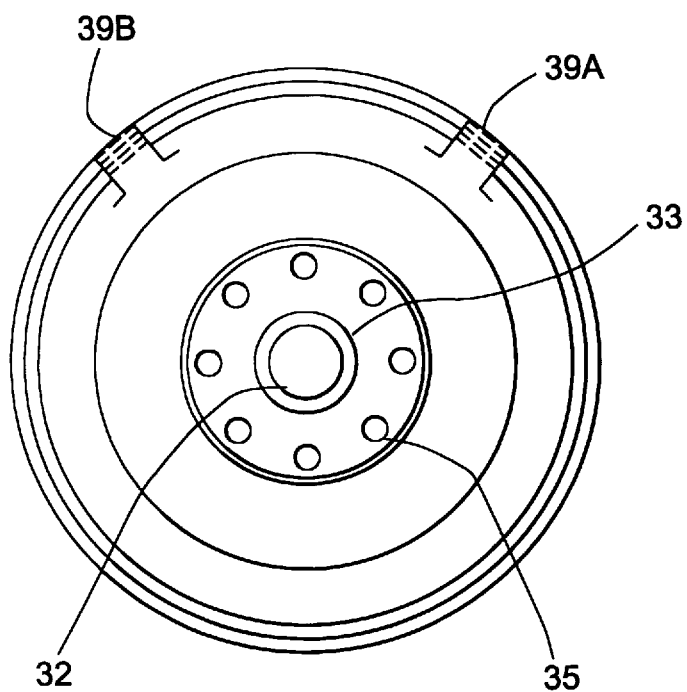
FIG. 7 shows a cross-sectional view of the combustor of FIG. 6, taken along line VII—VII of FIG. 6.

The third embodiment of the invention, shown in FIGS. 6 and 7, relates to a burner/injector means 30 equipped with combustor means 31 comprising a central channel 32 for injection of solid material particles which are carried through the channel 32 by the flow of a compressed carrier gas, a plurality of first oxidizing gas nozzles 35 (preferably including a converging-diverging Laval nozzle) at least partially surrounding the central channel 32 and directing a controllable flow of a highly concentrated first oxidizing gas into the liquid-cooled combustion chamber 34 and at least one second outlet nozzle 33 at least partially surrounding the central channel 32 for directing a controllable flow of fluid hydrocarbon fuel into a liquid cooled combustion chamber 34. This fluid fuel at least partially mixes with the controllable flow of the first oxidizing gas inside of the combustion chamber 34 and forms a high temperature flame directed through the outlet opening of the combustion chamber 36 toward the furnace interior. The central channel 32 can have a replaceable pipe 40 made of erosion resistant material disposed therein.

The third embodiment shown in FIG. 6 has a mixing chamber 37 as well as a combustion chamber 34. Mixing of the ignitable components, such as hydrocarbon fuel, combustible injected solid particles, and carrier gas (when applicable), can at least partially occur in the mixing chamber 37. The burning of the hydrocarbon fuel and creating the high velocity impinging flame is carried out at least partially in a liquid-cooled combustion chamber 34 located inside the body of the burner/injector means and downstream of the mixing chamber 37, whereby flame shaping occurs inside the combustion chamber. It is preferable to discharge continually a substantially reduced flow of the fluid hydrocarbon fuel, first oxidizing gas and carrier gas during at least a part of the steelmaking cycle, thereby protecting the combustion chamber 37 from plugging with slag or splashing iron-carbon melt.

The burner/injector means 30 is liquid cooled, preferably water cooled, having a water inlet 39A and water outlet 39B. The burner/injector means 30 can be equipped with additional channels for injection of an additional oxidizing gas and/or solid lump of fines materials (not shown in FIGS. 6 and 7). The burner/injector means 30 may optionally comprise additional multiple openings (not shown in FIGS. 6 and 7) for directing a second oxidizing gas to participate in the combustion of the fuel in the manner similar to the first embodiment of the present invention shown in FIG. 1. The optional second oxidizing gas should preferably have an oxygen content less than the first oxidizing gas.

It should be understood that multiple openings of the burner/injector means 30 introducing the hydrocarbon fuel and the first oxidizing gas can alternate positions and the burner/injector means will still be able to operate in accordance with this invention.

When this third embodiment of the burner/injector operates injecting solid carbonaceous fines through the pipe 40 during scrap melting and refining in the furnace, the first oxidizing gas, preferably having 90% oxygen, is injected with a high (optionally supersonic) velocity to at least partially burn the injected carbonaceous fines. When the hydrocarbon fuel is currently injected into the combustion chamber, the first oxidizing gas participates in the combustion of the hydrocarbon fuel also.

Figure 8:
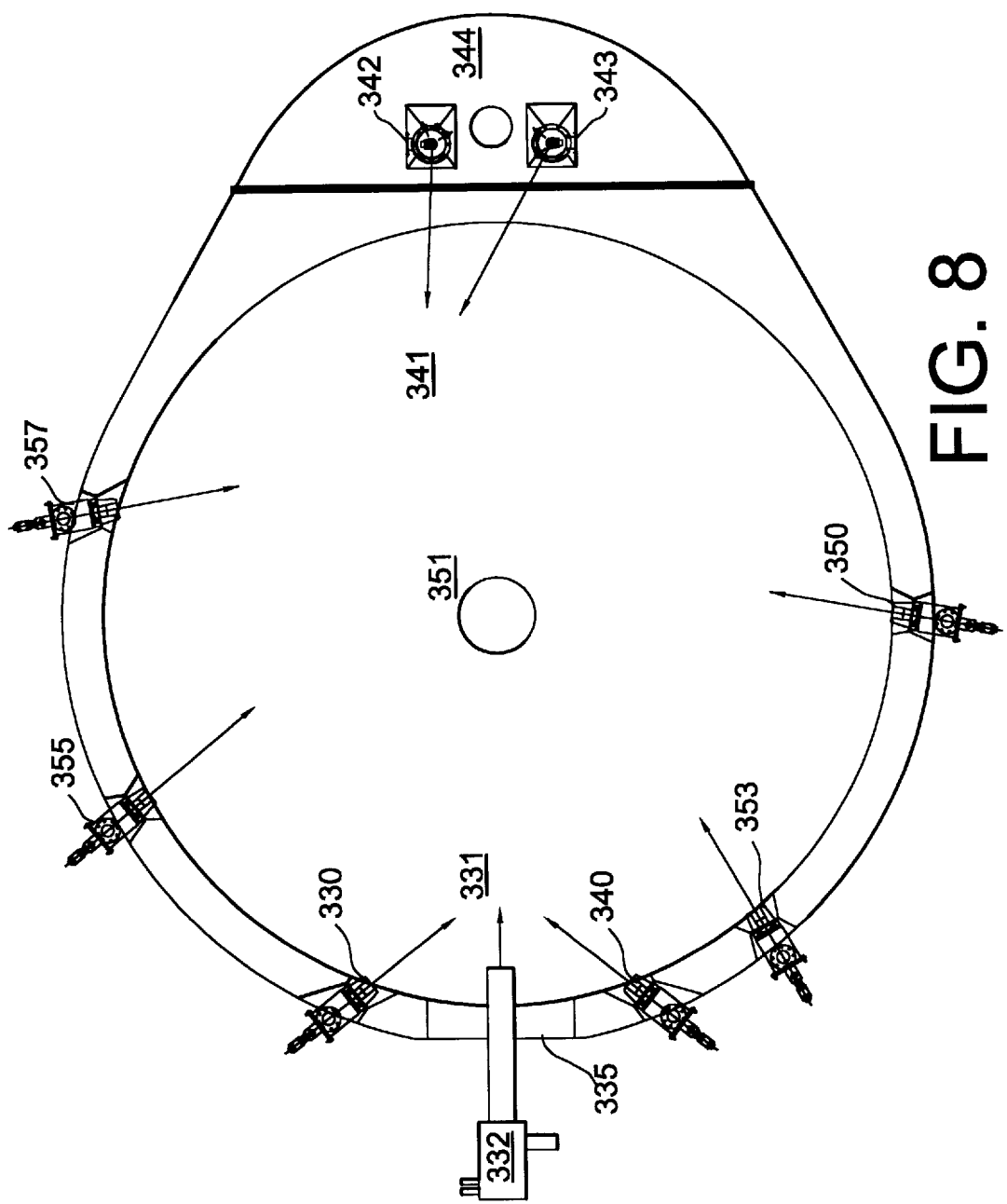
FIG. 8 shows the location of components of multiple burner/injector means in an electric arc furnace in accordance with the invention.

When an electric arc furnace using the single or multiple burner/injector means operates in accordance with the invention, each combustor means may comprise multiple combustor means operating in cooperation with each other, wherein at least some of the combustors are equipped with a means for solid particle injection and/or high velocity oxygen injection. Three different arrangements of the burner/injector means installation are shown in FIG. 8, which illustrates the layout of the several combustor means in the electric arc furnace side walls. The first burner/injector means comprises two combustors 330 and 340 for carrying out the scrap melting step at a predetermined area 331 near the slag door 335. The scrap melting step is followed with a step of solid carbonaceous fuel and additional oxygen injection, which is carried out separately or preferably simultaneously by each burner toward this predetermined area 331. The burner/injector means may optionally include a movable door lance 332 for injection of oxygen at least partially toward the predetermined area 331 for iron-carbon melt refining. The lance 332 may optionally include a means for injecting solid carbonaceous fuel and/or basic slag forming material. One or both combustors can be equipped with a means for injecting basic slag forming materials toward the predetermined area 331 near the slag door 335.

A second burner/injector means comprises two combustor means 342, 343 located at the spout area 334. These combustors are capable of first firing into the furnace interior toward a predetermined area 341 for scrap melting purposes and then injecting toward this predetermined area 341 the combination of solid carbonaceous fuel through one of the combustor means (e.g., 342) and supersonic oxygen through the other combustor means (e.g., 343). Optionally, injection of basic slag forming material can also be carried out by one or both of the combustor means 342, 343, preferably after some, and more preferably after a substantial amount, of the carbon and oxygen has already been injected by these combustor means.

The third burner/injector means 350 in FIG. 8 utilizes a single combustor means for melting scrap and for the combined injection of high velocity oxidizing gas and at least one type of solid material particles such as carbonaceous fuel, basic slag forming material, electric arc furnace dust for recycling, etc., or any mixture thereof. The burner/injector 350 can be used for the dedicated purpose of rapid slag forming around the arc. The combustor is permanently installed at a hot spot area so that the arc and the combustor very rapidly melt the scrap located in the predetermined area 351 between the electrode and the combustor. The separate or combined carbon and oxygen injection is initiated very early, prior to a substantial amount of scrap melting at cold spots including the cold spots 331, 341 where the other burner/injector means are operated. It should be understood that electric arc furnace dust (or other solid particles) can also be injected through any combustor equipped with the means for injecting of solid particles shown in FIG. 8 and/or through the door lance 332. It should also be understood that any and all the above combustors and/or the movable door lance 332 can be equipped with means for injecting an additional oxidizing gas for post-combustion of CO inside the furnace. Also, other burner/injector means 353, 355, and 357 are also shown in FIG. 8 that can be used in conjunction with the arrangements of burner/injector means discussed above.

Figure 9:
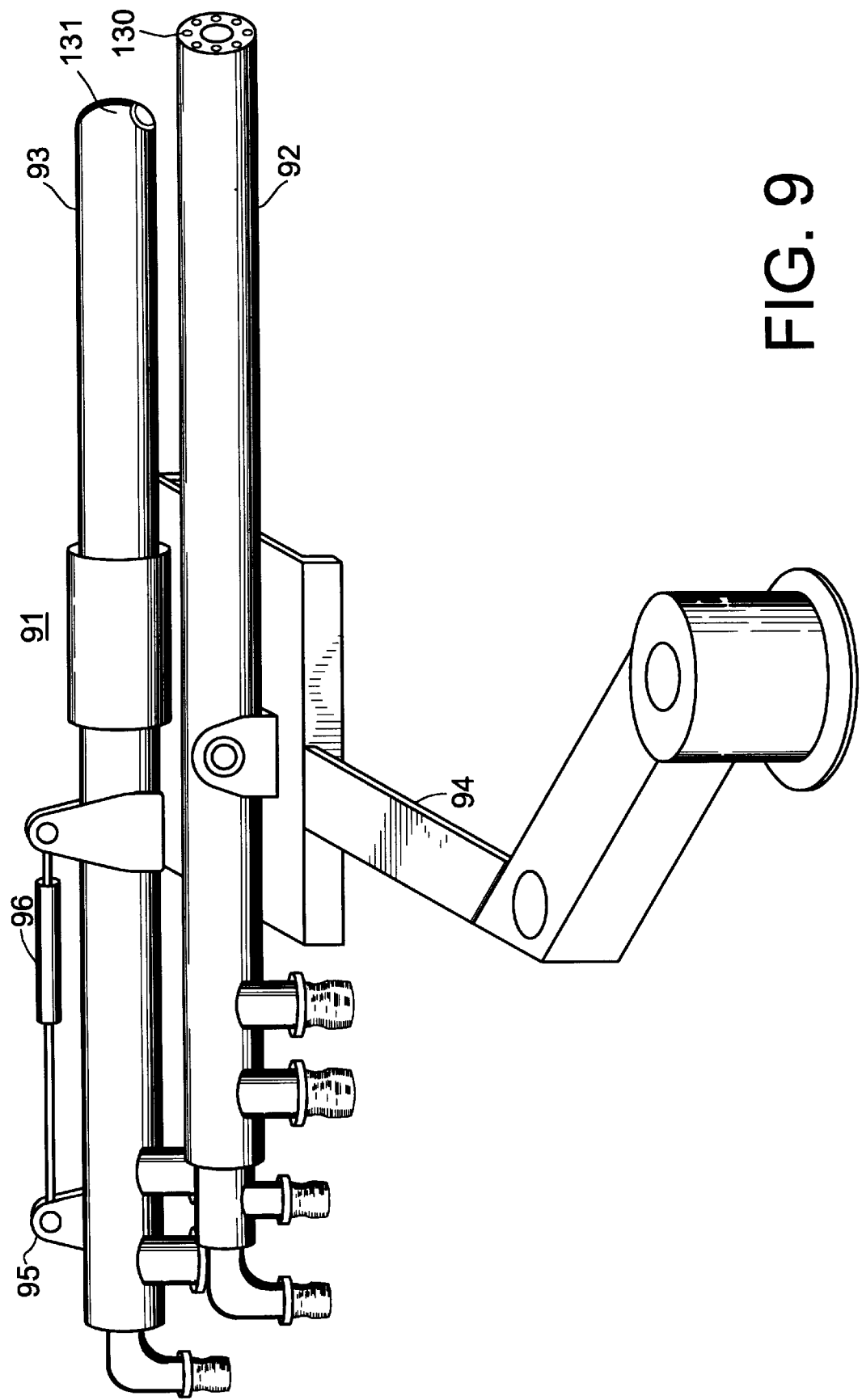
FIG. 9 shows a schematic of a fourth embodiment of a burner/injector means in accordance with the invention for operating through the slag door of the furnace.
Figure 15:
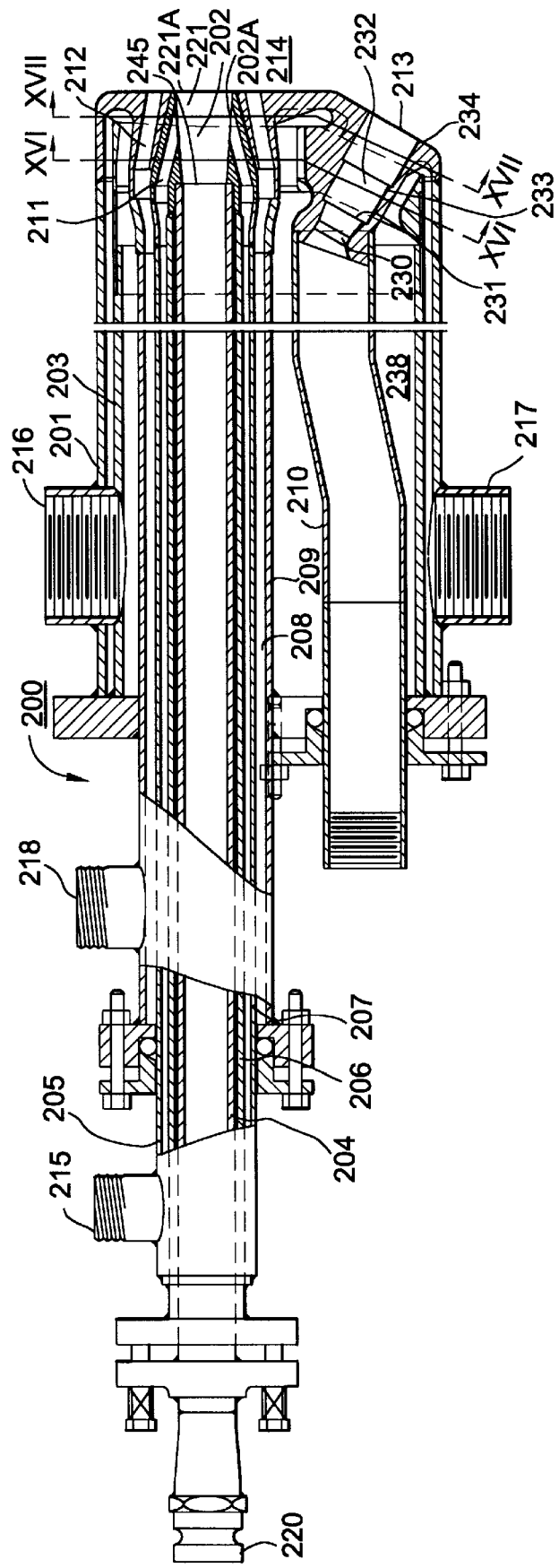
FIG. 15 shows a side cross-sectional view through the center of a sixth embodiment of a burner/injector means in accordance with the invention, which is designed for operating through the slag door of the furnace.
Figure 16:
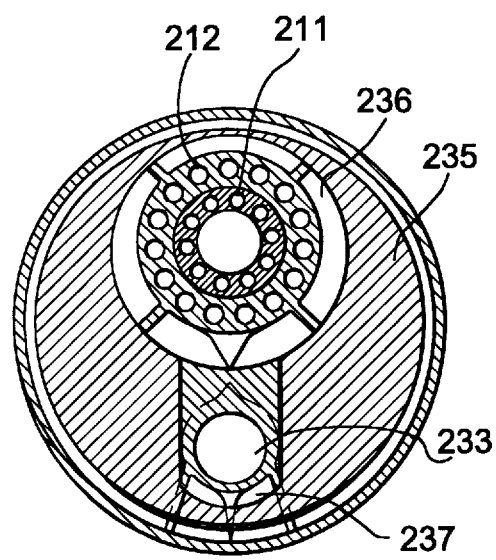
FIG. 16 shows a side cross-sectional view of the burner/injector means of FIG. 15, taken along line XVI—XVI of FIG. 15.
Figure 17:
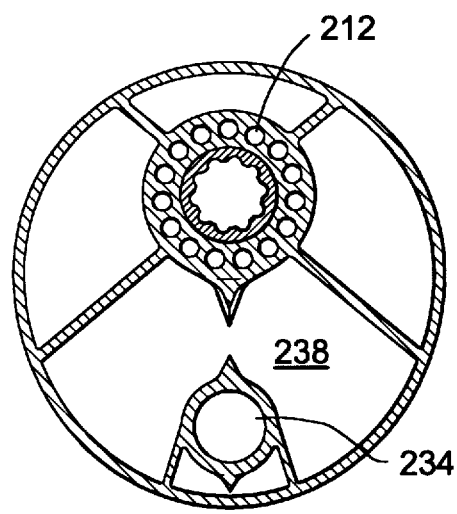
FIG. 17 shows a side cross-sectional view of the burner/injector means of FIG. 15, taken along line XVII—XVII of FIG. 15.
Figure 18:
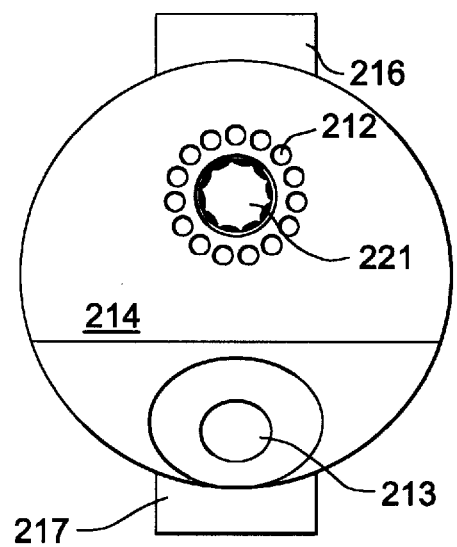
FIG. 18 shows a front view of the burner/injector means of FIG. 15.

The fourth embodiment of the invention relates to a burner/injector means designed to operate preferably through the slag door opening that is at least partially opened. As shown in FIG. 9, this burner/injector means 91 can comprise two movable liquid-cooled lances 92, 93 supported by a main movable arm 94 capable of moving the lances from idling storage position, in which operating ends of both lances are located outside the furnace, to several operating positions, in which the operating ends of the lances 130 and 131 are located in front or inside of the slag door opening. An additional auxiliary movable arm 95 can optionally be attached to at least one of the lances 92, 93 to provide relative movement forward and back along the arm 94 of the attached lance relative to the other lance. This auxiliary arm movement is used to move the operating end of one lance in front of the operating end of the other lance by the use of actuator 96. Alternatively, a combined or single lance, as shown in FIG. 15, may be used in conjunction with the arm 94, wherein the two lances 92, 93 are contained in a single liquid-cooled enclosure.

Figure 10:
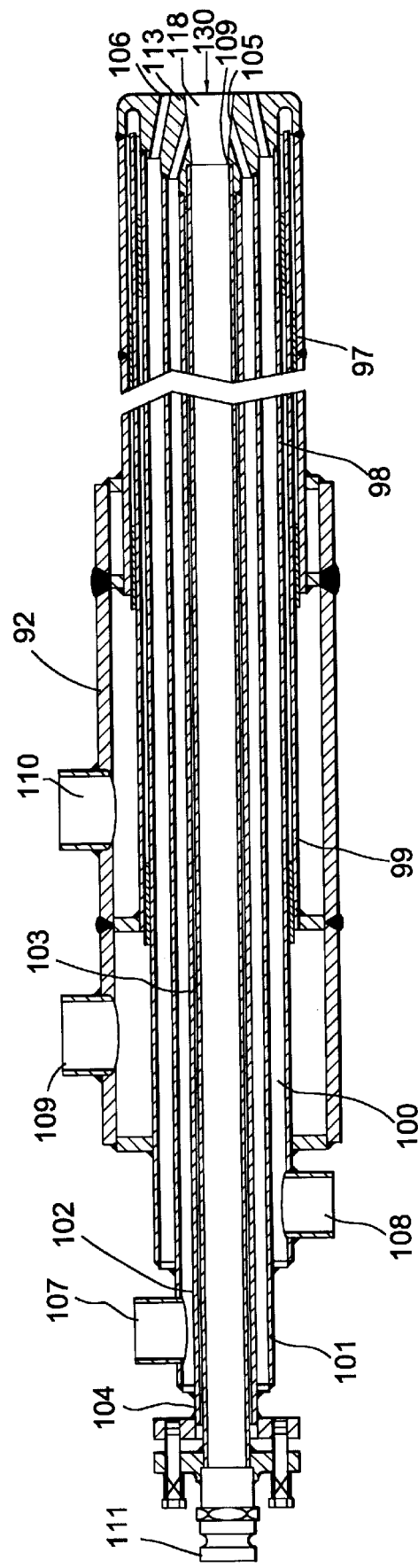
FIG. 10 shows a side cross-sectional view through the center of a fourth embodiment of a combustor of a burner/injector means.
Figure 11:
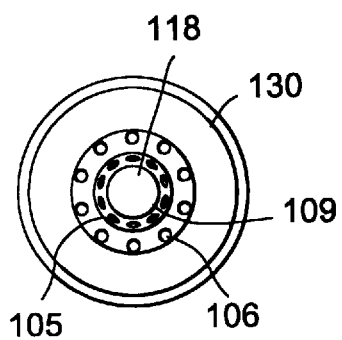
FIG. 11 shows a front view of the combustor of FIG. 10, taken along line XI—XI of FIG. 10.

The first of the two lances is a burner/injector lance 92, shown in FIGS. 10 and 11. The burner/injector lance 92 comprises an outer water-cooled conduit 97, an inner water-cooled conduit 98, a partitioning water-cooled conduit 99, a first supply passage 100 for the first oxidizing gas formed between the inner water-cooled conduit and oxidizing gas inner conduit 101, a second supply passage 102 for fluid hydrocarbon fuel formed between the oxidizing gas inner conduit and a fluid fuel inner conduit 103, a third supply conduit 104 having a third outlet opening 109 and having a easily replaceable pipe therein, preferably made of erosion-resistant material, for introduction into the furnace of solid particles (e.g., solid carbonaceous fuel, lime, dolomite, EAF dust, deoxidizing materials, ferroalloys, basic slag forming materials, DRI, iron carbide, etc.) carried by a compressed carrier gas (e.g., compressed air, carbon dioxide, nitrogen, natural gas, oxygen, or a mixture of some of these gases), at least one first outlet nozzle 106 for discharging of a first oxygen rich oxidizing gas (e.g., oxygen, oxygen enriched air, etc.), and at least one second outlet nozzle 105 for discharging of fluid hydrocarbon fuel.

The first and second outlet nozzles 105, 106 and the third outlet opening 109 allow discharging and subsequent mixing of the first oxidizing gas and the carrier gas to form a high temperature flame at the operating end 130 of the first lance, wherein the first outlet nozzles 106 are capable of the discharging multiple high velocity jets of the first oxidizing gas in the direction about the formed by the mixing of the hydrocarbon fuel and the carrier gas in the mixing chamber 118 downstream of the third outlet opening 109. The pressure of the first oxidizing gas is preferably above 50 psi.

The mixing chamber 118 has a surrounding wall, preferably having a conical shape in cross section, and a discharge opening 113. The diameter of the mixing chamber discharge opening 113 is preferably larger than the diameter of the third outlet opening 109. As shown in FIG. 10, it is preferred that the second outlet nozzles 105 are disposed in the surrounding wall, thereby allowing fluid communication between the second supply conduit 102 and the mixing chamber. It is also preferred that the cross-sectional area of the surrounding wall of the mixing chamber enlarges relative to the central axis of the mixing chamber in a direction toward the discharge opening, thereby forming an outlet nozzle.

The compressed carrier gas can be discharged with or without solid carbonaceous fuel particles (e.g., coal) and/or other solid fines through an open end of the pipe 104 adjacent to the mixing chamber 118. When the compressed gas is discharged with solid fines, this gas directs the flows of the discharged particles along the central axis of the high temperature flame, so that these flows of solid particles and carrier gas at least partially participate in mixing and combustion with the first oxidizing gas stream. The carrier gas is preferably at a pressure in excess of 10 psi, more preferably in excess of 20 psi, and most preferably in excess of 40 psi. When the carrier gas is air or oxygen, then the carrier gas can be used as an auxiliary oxidizing gas.

The first burner/injector lance 92 also comprises a fluid hydrocarbon fuel inlet 107 communicating with the second supply conduit 102, a first oxidizing gas inlet 108 communicating with the first supply conduit 100, a cooling water inlet 109 and a cooling water outlet 110 communicating with the water-cooling system of the lance formed by water-cooled pipes 97, 98, 99, and a compressed carrier gas and solid fines supply inlet 111 communicating with an easily replaceable pipe in the third supply conduit 104.

The first outlet nozzles 106, which direct the high pressure first oxidizing gas, are preferably disposed outside and adjacent to the discharge opening 113. The flows of compressed carrier gas, solid particles, when used, and hydrocarbon fuel expand, mix and interact with each other as they move throughout and exit the mixing chamber discharge opening in a direction generally along the central axis of the mixing chamber. The first outlet nozzles 106 direct multiple streams of the first oxidizing gas generally parallel to the central axis of the mixing chamber. Although the relationship is generally parallel, the multiple streams of the compressed first oxidizing gas expand toward each other after discharging from the first outlet nozzles to form a high velocity enveloping first oxidizing gas stream. This high velocity first oxidizing gas stream envelopes, partially mixes with, and partially burns the hydrocarbon fuel and carbonaceous particles and further accompanies the stream of the unburned portion of injected carbonaceous and/or other solid injected particles. This increases the delivery range and the slag penetrating ability of the unburned portion of the injected particles.

Alternatively, burning of the hydrocarbon fuel and creating the high velocity impinging flame can occur at least partially in a liquid-cooled combustion chamber (which can be arranged similar to the combustion chamber 34 of the third embodiment of this invention) located inside the body of the burner/injector lance 92. This combustion chamber 34 design is illustrated in FIG. 6. Such a combustion chamber, which allows flame shaping to occur, is located downstream of the mixing chamber. The combustion chamber preferably is in fluid communication with both the mixing chamber and the first oxidizing gas, wherein at least partial mixing and ignition of the mixture occurs in the combustion chamber. The fourth embodiment may further comprise a means of directing a second oxidizing gas into the combustion chamber to participate in combustion of the hydrocarbon fuel.

Figure 12:
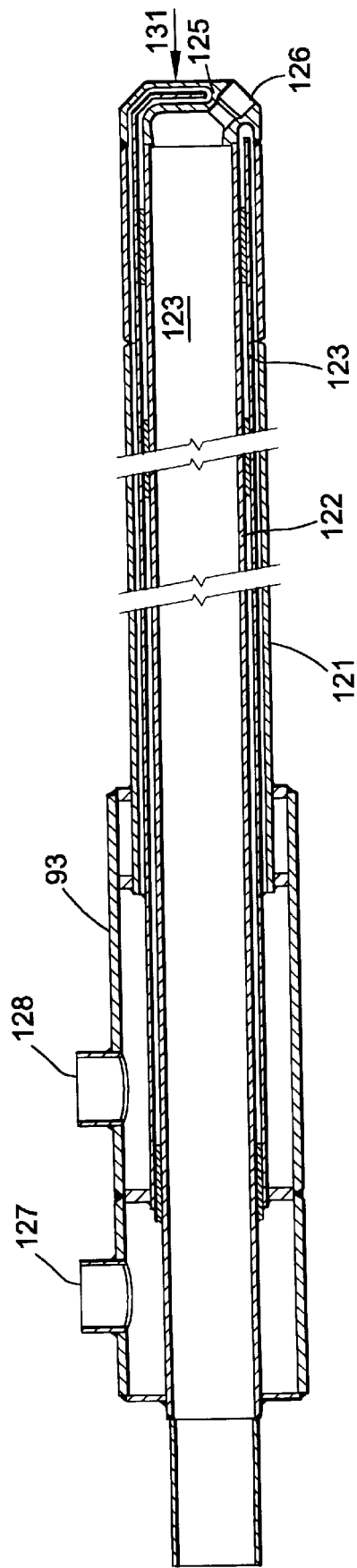
FIG. 12 shows a side cross-sectional view through the center of an auxiliary oxygen lance of the fourth embodiment of the burner/injector means in accordance with the invention, which is designed for operating through an opening in the furnace.
Figure 13:
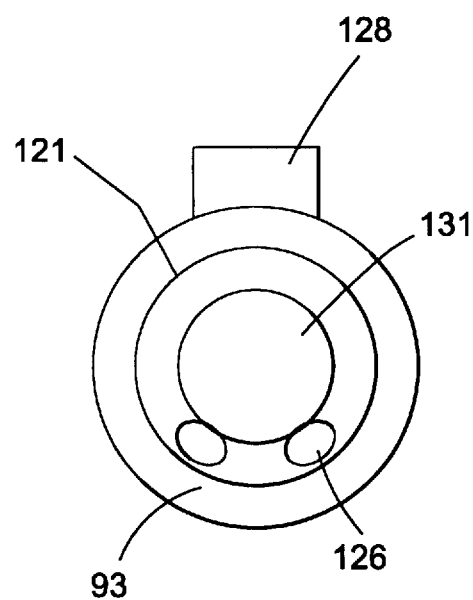
FIG. 13 shows a front view of the auxiliary oxygen lance of FIG. 12.

The second lance 93, shown in FIGS. 12 and 13, is the oxygen injecting lance which is used primarily for iron-carbon melt refining. This oxygen injecting lance consists of an outer water-cooled conduit 121, an inner water-cooled conduit 122, a partitioning water-cooled conduit 123, an additional oxidizing gas (preferably high pressure oxygen) supply conduit 124 formed inside the inner water-cooled pipe and at least one additional oxidizing gas outlet nozzle 125, each nozzle 125 having an opening 126 capable of discharging high velocity (preferably supersonic) stream or streams of the additional oxidizing gas preferably angled downwardly. The additional oxidizing gas should impinge the iron-carbon melt inside the EAF at an angle of approximately 35°–55° and preferably 42°–48° when the additional oxidizing gas stream or streams are discharged from the lance 93 which is positioned horizontally or inclined toward the surface of the molten bath inside the EAF.

The additional outlet nozzle 125 can further comprise a converging-diverging section. It is preferred that converging-diverging section of the oxygen injecting lance is disposed at an angle of at least 15 degrees, and preferably 30 degrees, downwardly below the central axis of the mixing chamber.

The second lance 93 can also have flow enhancing sections downstream the converging-diverging section, as shown in FIG. 15. The high pressure additional oxidizing gas should have an average oxygen content in excess of 80%. The additional outlet nozzle 125 can be optionally incorporated in a first liquid-cooled burner/injector lance enclosure together with and adjacent to the mixing chamber. The lances should further comprise a controlling means for controlling the burner/injector operation as well as that of the arm 94.

The second lance also comprises a cooling water inlet 127 and a cooling water outlet 128 communicating with the water-cooling system of the lance formed by water-cooled conduits 121, 122, and 123. Optionally, the lance 93 can be equipped with multiple discharging orifices (not shown in FIGS. 12 and 13) for a secondary additional oxidizing gas injection, which can be used for the purpose of post-combustion of CO which is formed by the carbon oxidation reactions involving the additional oxidizing gas. These orifices can be disposed through the front of the operating end 131 of the second lance 93.

When an electric arc furnace using the fourth embodiment of the burner/injector means operates in accordance with the invention, the burner lance 92 initially fires through the at the least partially open slag door (shown generally in FIG. 8) to preheat and melt a light portion of scrap located at the slag door during the initial stage of scrap melting. During this initial stage, the burner lance 92 uses fluid hydrocarbon fuel and the first oxygen rich oxidizing gas which is delivered, respectively, through the burner inlets 107 and 108. Advisably, the compressed carrier gas (preferably air) is simultaneously delivered to inlet 111. After the fluids are discharged through their respective discharge nozzles and openings, they are mixed and ignited, forming a high velocity flame at the operating end 130. Prior to ignition, the burner lance operating end 130 is positioned by the movable arm 94 in front of the at least partially open slag door, so that the operating end faces the scrap pile through the slag door and so that the flame impinges the scrap located at the door to heat the contacted scrap. Optionally, arm 94 can provide for spanning of operating end 130 so that the flame impinges a majority of the scrap pile accessible for the flame impingement through the slag door opening.

Initially, it is desired to maintain the controllable flows of the hydrocarbon fuel, the first oxidizing gas, the optional second oxidizing gas, when used, to provide a ratio of total oxygen to fuel near the stoichiometric combustion ratio. It is more desirable to maintain the ratio of oxygen to hydrocarbon fuel 10%, and even 15%, above the stoichiometric ratio. After a portion of the light scrap located in front of the burner has been melted, and a portion of the heavier scrap is preheated to above 1400° F., and preferably above 1800° F., it is desirable to adjust the flow of at least one of the hydrocarbon fuel, the first oxidizing gas or the optional second oxidizing gas to increase the ratio of total oxygen to hydrocarbon fuel to at least 50% above the stoichiometric ratio for complete combustion. This causes the preheated scrap to be cut or burned. The ratio of total oxygen to fuel can be increased to 100%, or even up to 300%, greater than the stoichiometric ratio.

After at least a part of the scrap pile contacted by the flame is partially melted and optionally cut or burned creating an opening or openings inside the preheated scrap, it is advisable to initiate the injection of carbonaceous fuel fines with the flow of compressed carrier gas through the third supply conduit via pipe 104 so that carbonaceous fuel fines at least partially participate in the combustion inside of the flame envelope by mixing with oxygen delivered with the first oxidizing gas. The first oxidizing gas has a velocity sufficient to enhance the penetrating ability and range of the unburned portion of the injected solid particles while participating in burning a gaseous mixture of hydrocarbon fuel and combustible components of the injected solid particles, thereby creating a high velocity luminous impinging flame directed along the central axis of the mixing chamber and away from the burner/injector means and preferably into the opening or openings formed inside the preheated scrap.

The discharge velocity of the first oxidizing gas of the burner/injector means should preferably exceed the discharge velocities of the hydrocarbon fuel and carrier gas by at least 25%, preferably 50% and more preferably 70%, thereby creating a high velocity highly oxidizing gas stream surrounding the discharged gaseous mixture, wherein the oxidizing gas stream participates in the burning of the hydrocarbon fuel and the at least partial burning of combustible components of injected solid particles. The multiple streams of the first oxidizing gas expand toward each other after exiting the first outlet nozzles, thereby creating a high velocity highly oxidizing gas stream surrounding and enclosing the discharged gaseous mixture. This creates a rapidly expending surrounded stream of hot combustion products containing hot luminous burning particles, wherein the surrounded stream of combustion products rapidly heats and accelerates the unburned portion of injected particles, thereby minimizing the dispersion of injected particles and enhancing the delivery range and the penetrating ability of the unburned portion of the injected solid particles. Preferred velocities of the first oxidizing gas are over 300, preferably over 600, and more preferably over 900, feet per second.

It is desirable to adjust the ratio of oxygen to fuel by adjusting the flow of at least one of the fluid flow of hydrocarbon fuel, the first oxidizing gas, the auxiliary oxidizing gas (e.g., carrier gas having oxygen), or the optional second oxidizing gas to increase the ratio substantially above the stoichiometric ratio and to make an excess amount of oxidizing gas available for at least partial oxidation of the injected solid carbonaceous fuel. It is preferred that the ratio of oxygen to fuel be 100%, more preferably 200%, and even more preferably 300% greater than the stoichiometric ratio. The carbonaceous fuel particle injection provides for increased flame temperature and generation of hot CO formed by partial oxidation of the injected carbonaceous fuel. This allows for the protection of the hot scrap from excessive oxidation by the flame and ambient air inspired through the at least partially open slag door. The rest of the carbonaceous fuel injected by the burner lance accumulates inside of the scrap pile and inside of the slag where this fuel is continuing to be oxidized with oxygen.

To speed the melting of scrap located at the slag door, it is advisable in many cases to cut preheated scrap during and/or preferably at the end of the scrap melting cycle. In such a case, when at least a part of the scrap pile located at the open slag door has been preheated to at least 1400° F. and preferably above 1700° F., it is advisable to substantially reduce the flow of hydrocarbon fuel and optionally to increase the flow of first oxidizing gas (optionally sonic velocity or above) so that preferably at least 30%, and more preferably at least 50%, of excess (above stoichiometric ratio) oxygen is supplied with the flame to cut the preheated scrap pile. The preferred ratio of total oxygen to hydrocarbon fuel can be 100%, 200%, and even 600% above the stoichiometric ratio, whereby a high velocity highly oxidizing flame is created which causes at least one of rapid cutting, or partial melting of a portion of the preheated scrap by rapid oxidation with the excessive amount of hot super stoichiometric oxygen present in the hot combustion product formed by combustion reactions occurring in the impinging flame prior to contact with the scrap. If the ratio of oxygen to fuel is increased to 300% above the stoichiometric ratio, the effects are at least one of rapid ignition, partial melting, or partial cutting of a light portion of the preheated scrap. Optionally, during this period of scrap melting, the entire flow of hydrocarbon fuel and carrier gas can be terminated or reduced to a very low flow. It is advisable in some cases to continue the solid carbonaceous fuel injection during this period of scrap cutting.

When the above-described scrap cutting cycle is used, a portion of preheated scrap will be oxidized by the excess oxygen. Rapid oxidation of light scrap forms a high temperature light scrap burning zone which radiates heat and rapidly melts the scrap surrounding the scrap burning zone. The heavy scrap pieces contacted by oxygen will be cut and submerged. During the above-described stages of scrap melting and/or cutting near the slag door, the operating end 130 of the burner lance could be positioned preferably at least several inches in front of the second oxygen injecting lance operating end 131.

When scrap located at the slag door is at least partially melted and optionally cut so that adequate space is cleared for introduction of the lances into the slag door without hitting scrap pieces, the lance supporting arm 94 moves both lances 92, 93 toward the furnace interior through the slag door opening. Prior to or simultaneously with this movement, the optional auxiliary arm 95 may move one of the lances so that the second oxygen injecting lance 93 moves forward or the first burner lance 92 moves back along the supporting arm 94. The operating end 131 of the second lance may be repositioned by this optional movement at least 6–18 inches forward of the burner lance operating end 130. The new position of the supporting arm 94 should preferably be chosen to ensure that a high velocity flow of the additional oxidizing gas is injected through the nozzle 126 toward the melt located inside of the furnace and is directed to impinge the metallic melt surface at a spot located at least 6 inches, and preferably at least 10 inches, away from the refractory bank of the furnace.

Either shortly before or immediately after the lances 92, 93 are moved into this new position, the flow of the additional oxidizing gas is initiated through the oxygen injecting lance 93. The objective of this mode of burner/injector means operation is to form a foamy slag on the iron-carbon melt surface located near the slag door. The pressure and flow of this additional oxidizing gas is maintained to provide for preferably a subsonic discharge velocity, and the flows of the hydrocarbon fuel, the first oxidizing gas and the solid carbonaceous fuel are preferably adjusted so that the flow of the first oxidizing gas is only capable of complete combustion of less than 75%, preferably less than 50% and even more preferably less than 30%, of injected carbonaceous fuels. Optionally, the flow of hydrocarbon fuel during this period of time is terminated or is greatly reduced so that less than 30% and preferably less than 20% of the total oxygen being introduced by the first oxidizing gas is sufficient for complete oxidation of the hydrocarbon fuel flow. The flow of carrier gas and carbonaceous material can be periodically terminated to maintain the desired average rate of solid particle injection.

When the flow of hydrocarbon fuel is maintained, the first oxidizing gas is partially consumed by combustion. The hot combustion products are mixed with a remaining portion of the first oxidizing gas. This raises the temperature of the remaining portion of the oxidizing gas and accelerates the oxidation reactions in which this remaining oxygen participates. In addition, the reduced flow of hydrocarbon fuel protects the second outlet nozzle 105 from plugging with foamy slag.

During this stage of furnace operation, a part of the injected solid carbonaceous fuel reaches the surface of the iron-carbon melt which is accumulated on the bottom of the furnace near the slag door. These particles penetrate into and mix with the slag layer formed on the top of the iron-carbon melt. Part of the additional oxidizing gas directed down toward the melt penetrates the slag layer and contacts this melt. Solid carbonaceous fuel reacts with oxides present in the slag and with the additional oxidizing gas contacting the slag layer, forming hot CO which is emitted through the slag layer, thereby making a foamy slag. CO is also generated by oxidation of carbon in the melt via reactions with the additional oxidizing gas and slag oxides. When CO is exhausted from the slag, it mixes with the flow of the remaining portion of the first oxidizing gas which is preferably provided by the burner/injector means above the area where CO is mainly generated by the reactions involving the additional oxidizing gas. The first outlet nozzle of the burner/injector is preferably arranged in close proximity with a position of the additional nozzle of the oxygen injecting lance and in such manner that the additional oxidizing gas is directed through the additional nozzle to impinge on the surface of the iron-carbon melt to oxidize carbon therein and to generate a hot carbon monoxide emission, wherein the flow of the first oxidizing gas is directed so that a portion of the first oxidizing gas can mix with the flow of carbon monoxide generated in area of the additional oxidizing gas impingement on the surface of the iron-carbon melt.

The orientation and direction of the nozzles discharging the first and the additional oxidizing gases should be arranged to maximize the mixing and the post-combustion of the CO with the flow of the oxidizing gases during the foamy slag forming stage of scrap melting. The operation of both lances in the above-described manner with this mode of slag foaming is continued until additional scrap (located further away from the slag door) is melted by the arc (which is now submerged into the foamy slag) and by exothermic oxidation reactions maintained with the flow of the oxidizing gases injected by the burner/injector means. Optionally, when the oxygen injecting lance is equipped with the secondary additional oxidizing gas injecting means, the flow of the secondary additional oxidizing gas can be directed to participate in the CO post-combustion instead of or together with the first oxidizing gas.

After scrap located at least one foot and preferably at least two feet behind the slag door is melted down, the supporting arm 94 moves the lances 92, 93 further inside of the furnace interior. The new position of the second lance provides an additional oxidizing gas impinging spot positioned preferably at least 18 inches and more preferably at least 24 inches away from the refractory bank of the furnace. After the burner/injector means lances are moved into this new position, a rapid melt refining cycle can be initiated. During the melt refining cycle, the flow of the additional oxidizing gas is increased (and, optionally, the flow of the secondary additional oxidizing gas is also increased) to provide a jet or jets of preferably supersonic velocity which are introduced through the additional nozzle or plurality of nozzles of the oxygen injecting lance to ensure a desired rate of melt refining. It is advisable to continually discharge a substantially reduced flow of fluid hydrocarbon fuel to protect the second outlet nozzle 105 from foamy slag plugging during the melt refining. It is likewise preferred to continually discharge a substantially reduced flow of gases (e.g., first oxidizing, second oxidizing, and the carrier gases, to protect the respective nozzles and openings). It is advisable in many cases to periodically or continually inject carbonaceous fuel with the burner/injector during the rapid refining melt.

The dimensions of the first outlet and the second outlet nozzles and the dimension of the discharge opening of the mixing chamber of the burner/injector means are arranged to allow the flow of the compressed carrier gas discharged into the mixing chamber to be maintain under the pressure which is sufficient to create a high velocity expanded gaseous flow capable of protecting the discharge opening and the first outlet and second outlet nozzles from plugging with slag in the furnace even when the discharge opening of the mixing chamber is completely submerged into the slag.

During this mode of operation, the other burner means optionally operating through the furnace side walls may change the firing stoichiometry and provide an extra amount of oxygen, so that the total amount of excessive stoichiometric oxygen injected by the side burners and by slag door burner/injector means exceeds the total amount of oxygen instantly needed to convert at least a majority of the instantly emitted CO inside of the furnace into $CO_2$.

It is advisable during the rapid refiring cycle to direct at least one stream of the first oxidizing gas is preferably directed above an area of the iron-carbon melt affected by injection of the additional oxidizing gas, wherein the stream of the first oxidizing gas assists in post-combustion of CO formed by the decarburizing action of the additional oxidizing gas. This mode of rapid melt refining can be also optionally assisted by additional oxygen injecting lances providing additional oxygen for melt refining, CO post-combustion inside the furnace, and/or CO post-combustion in the exhaust gases downstream of the furnace.

To improve slag foaming, preferably during the final part of the steelmaking cycle, the flow of burnt or dolomitic lime, raw dolomite particles, and/or limestone can be injected into the furnace through this lance, other burner/injector means, and/or another means to increase slag basicity and to reduce slag temperature. This will result in improvement of the ability of the slag to stay foamy and reduce the equilibrium amount of oxygen dissolved in the steel.

A stream of solid particles can be directed through the third supply conduit containing more than 25% of slag forming material after a portion of the scrap in the predetermined area of the furnace has melted. Alternatively, the solid particles can contain more than 50%, or even more than 70%, slag forming material. Also, after directing solid carbonaceous fuel particles into the furnace, there can be a separate step of injection of an additional stream of solid slag forming material through the mixing chamber and toward the predetermined area of the furnace after a portion of the scrap has melted.

Also, injection of a stream of solid deoxidizing and/or carburizing material particles for causing at least one of the results of deoxidizing of slag, deoxidizing of iron-carbon melt, or carburizing of iron-carbon melt can be performed. This step can be carried out by substituting the flow of at least one of the first oxidizing gas or compressed air carrier gas serving as the auxiliary oxidizing gas using compressed carbon dioxide, natural gas, or a mixture thereof, thereby preventing rapid oxidation of the injected materials, slag and the iron-carbon melt in area affected by injected deoxidizing material. The solid deoxidizing material can include carbon-bearing materials, ferroalloys, or a mixture thereof. The solid material injection step preferably is performed by directing a majority of injected deoxidizing and/or carburizing material discriminatorily toward the hottest spot of the furnace which is located near the electric arc.

Although this operation is described relating to the fourth embodiment of the invention, the steps apply to other embodiments of the invention, such as the first, second, or third embodiments. In addition, the conduits may be altered to direct different gases or particles than described herein.

The present invention also encompasses a fifth embodiment of the burner/injector means that may operate in the combustion chamber responsible for the final post-combustion of CO and hydrocarbon emitted from the EAF. This post-combustion burner injector means should use an oxygen rich oxidizing gas to minimize the additional amount of combustion products contributed by the burners and to later be treated at the dust collecting baghouse downstream of the combustion chamber. The oxygen rich oxidizing gas can be purchased oxygen and/or a combination of purchased oxygen and air. The use of oxidizing gas with and oxygen content higher than air increases the amount of heat being released per standard cubic feet of the newly formed combustion products and at the same time increases the temperature of the flame introduced in the combustion chamber.

During the final stage of the steelmaking cycle, the flue gases entering the combustion chamber have a very high temperature, above 2000° F. and often above 2500° F. Oxygen rich flames introduced under such conditions have the temperature of the flame core higher than 4000° F. and more likely higher than 4500° F. These conditions provide for rapid NO generation when combustion products containing a substantial amount of nitrogen are inspired inside of the flame envelope containing highly concentrated oxygen. To minimize additional $NO_x$ generation under such conditions, a cooling agent such as sprayed water or steam, may be introduced inside the flame. The introduction of water also creates conditions to enhance CO post-combustion in the exhaust gases passing through the combustion chamber. During the final stages of steelmaking, the $H_2O$ content in combustion products is greatly reduced because of the low firing rate of the burners in the EAF and the relatively small amount of water contained in the inspired ambient air downstream of the furnace. The kinetics of CO post-combustion can be described with the kinetic expression for the rate of change of CO mole fraction ($f_{CO}$) with time $$\frac{df_{co}}{dt} = 1.8 \times 10^{13} f_{co} f_{o2}^{0.5} f_{h2o}^{0.5} \left( \frac{P}{R'T} \right) \exp\left( -\frac{25000}{RT} \right)$$

where $f_{CO}$, $f_{O2}$, $f_{H2O}$ are the mole fractions of CO, $O_2$, and water vapor respectively, T is absolute temperature in degrees Kelvin, P is absolute pressure in atmospheres, t is time in seconds, R is the gas constant=1.986 Kcal/Kgmol °K., and R' is the gas constant in alternative units 82.06 atm $cm^3$/gmole °K.

This reaction shows dependency of the rate of CO post-combustion on the $H_2O$ concentration. Therefore, to improve CO post-combustion, it is desirable to burn hydrocarbon fuel to form $H_2O$ during CO post-combustion inside the furnace. It is also desirable in many cases to introduce $H_2O$ in the combustion chamber when the exhaust temperature is substantially above the CO ignition point.

It is important to understand that the equation describes the kinetic energy assuming that the temperature of all reacting molecules is the same. The preheating of injected water and/or steam to the temperature of exhaust gases takes time. Until preheating is achieved, the rate of reaction is low due to low temperature of $H_2O$ molecules and so, therefore, is the level of kinetic energy of $H_2O$ molecules.

Spraying water through the hottest zone of the hot oxygen rich flame will simultaneously accomplish two functions: first it preheats the water entering the combustion chamber (this will speed CO post-combustion reactions) and, second, it cools the flame hot zone by using the heat released in this zone for heating, volatilizing and superheating of the injected water.

Figure 14:
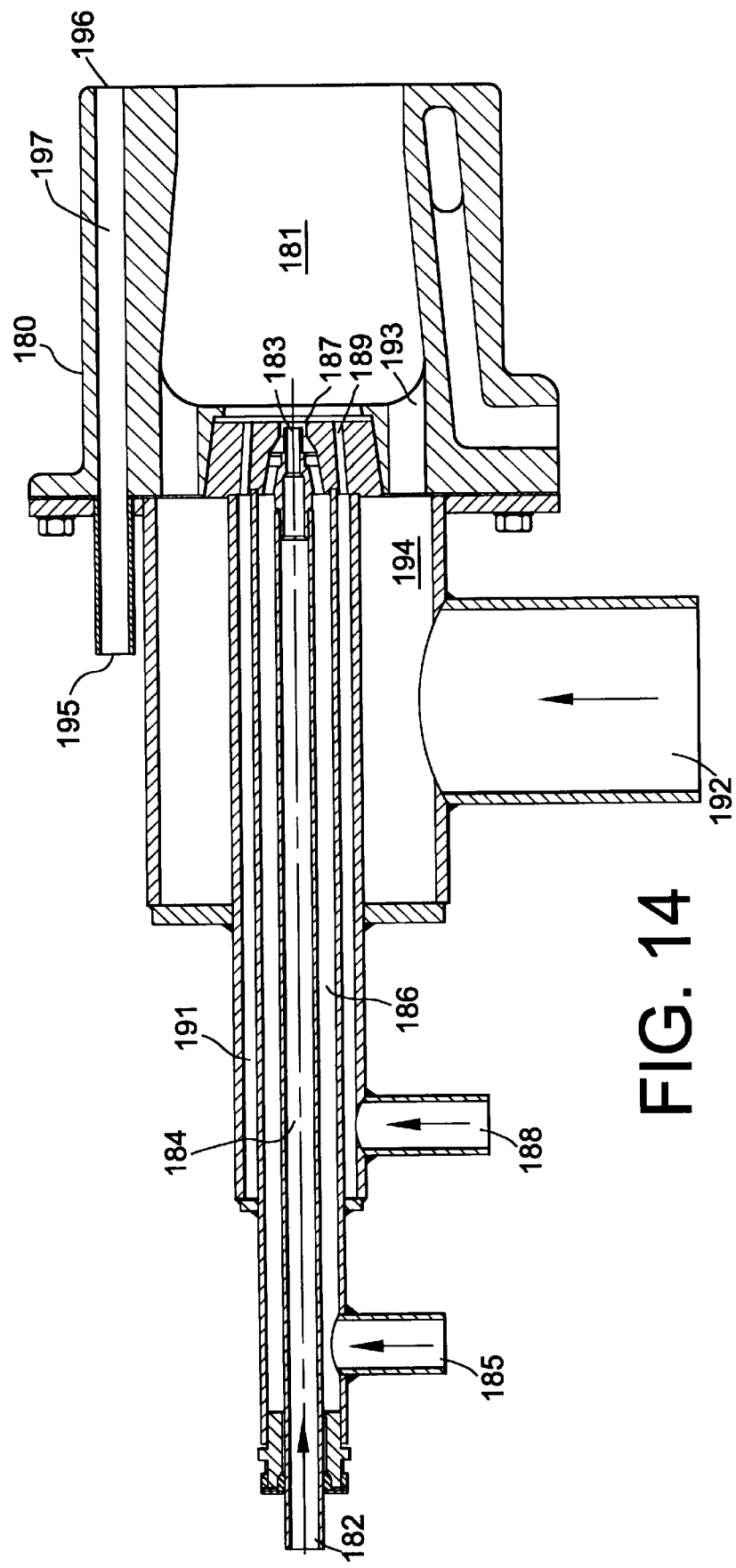
FIG. 14 shows a side cross-sectional view through the center of a fifth embodiment of a combustor of a burner/injector means in accordance with the invention, which is designed for operating in the combustion chamber of the electric arc furnace.

The fifth embodiment of the afterburning burner/injector means 180, shown in FIG. 14, allows for the use of an oxygen rich oxidizing gas and is equipped with an oxygen/water spraying nozzle. The afterburning burner/injector means is comprised of a liquid-cooled combustion chamber 181, a water inlet 182 communicating with a water outlet opening 183 by a water delivery pipe 184, a first oxygen rich oxidizing gas inlet 185 communicating with the first oxidizing gas outlet slot 187 by a first oxidizing gas delivery conduit 186, a fluid fuel inlet 188 communicating with multiple fuel outlet nozzles 189 by fuel delivery conduit 191, an optional second oxidizing gas inlet 192 communicating with optional multiple second oxidizing gas outlet openings 193 by an optional second oxidizing gas delivery conduit 194. The dimensions of the slot 187 and the water outlet opening 183 provide for the atomization of water discharged into the combustion chamber.

Optionally, the afterburning burner/injector means further comprises an additional oxidizing gas inlet 195 communicating with at least one outlet opening 196 through the additional oxidizing gas conduit 197. When the afterburning burner 180 operates during the earlier stage of scrap melting to maintain the temperature in the combustion chamber downstream of the furnace above the temperature needed for reliable CO ignition and rapid burning, the fuel and at least the first oxidizing gas are supplied and mixed in the combustion chamber 181 generating a high temperature flame. The water stream can be optionally supplied and atomized in the combustion chamber suppressing $NO_x$ formation. Later, when the temperature of the exhaust gases entering the combustion chamber exceeds the temperature of reliable CO ignition and the computerized process control means (or burner control system) or the operator determines the need for supplying extra oxygen into the combustion chamber for CO post-combustion purposes, the flow of fuel is substantially reduced and preferably completely eliminated and the flow of extra oxygen supplied by at least the first oxidizing gas (and optionally with the second and with an additional oxidizing gas to maximize the total oxygen volume and the mixing efficiency) is increased to provide extra oxygen for CO post-combustion in the exhaust furnace gases passing through the furnace combustion chamber. The flow of the water injected during this period of time is also predetermined by the burner control system and is preferably used to increase the rate of CO post-combustion and to inhibit $NO_x$ formation in the hot post-combustion reaction zone.

To minimize discharge of environmentally undesirable gases, this embodiment of the present invention anticipates thermal decontamination of the exhaust gases. The method comprises the steps of first exhausting hot gases generated during the steelmaking process from the furnace through a break-flange opening which inspirates ambient air therein and then conducting the exhaust gases toward a dust collecting baghouse means through a combustion chamber containment means equipped with at least one afterburning burner/injector means. The break-flange is used to connect the furnace exhaust elbow and the exhaust duct and comprises an inspirating gap therein which provides for inspiration of additional secondary ambient air into the exhaust gases evacuated from the furnace. When this additional inspirated air is mixed with cold exhaust gases during the initial cold phase of scrap melting, this mixing results in a further reduction of the exhaust gas temperature. This colder exhaust then travels into the combustion chamber which provides for additional mixing and retention time. Unfortunately, this additional retention time cannot ensure completion of CO post-combustion in the low temperature exhaust gases prior to flue gas emission into the atmosphere. Therefore, it is desirable to raise the temperature of the exhaust gases reaching the combustion chamber by the firing of additional burner(s) into the combustion chamber to raise the flue gas temperature to insure ignition of the CO and unburned hydrocarbons.

The temperature of the hot exhaust gases in the combustion chamber containment means is measured and the temperature measurement is communicated to the process control means. The process control means compares the temperature measurement with predetermined values, wherein when the comparison indicates that the temperature of the exhaust gases is below a predetermined temperature preset for reliable post-combustion of CO in the containment means, the process control means directs a hot flame from the afterburning burner/injector means to maintain the measured temperature near the preset predetermined temperature. The temperature preferably is measured adjacent to the containment means, preferably downstream the afterburner burner/injector. The predetermined temperature preferably is 1500° F., more preferably 1700° F., and even more preferably 1800° F. The predetermined temperature is also a function of the dimensions of the combustion chamber, wherein the smaller the size, the less retention time, and the higher temperature may be needed. It is also important to note that it is desired not to have the temperature exceed 2000° F. It is also desired not to exceed significantly the predetermined temperature because of the increased cost associated therewith.

The method also can measure the process parameters in the furnace influencing CO emissions from the furnace, including the electric power input and the quantity of hydrocarbon fuel and oxidizing gas introduced into the furnace, then communicating the results of these measurements to the process control means, comparing the communicated measured process parameters with the control model to predict the deficiency of oxygen in the exhaust gases entering the containment means and the necessary amount of extra oxygen which should be added to minimize the effluent levels of CO below environmentally regulated levels, and directing a controlled flow of extra oxygen with an oxygen rich gas via the afterburning burner/injector means to provide the needed extra oxygen into the containment means, wherein the oxygen rich gas mixes with the exhaust gases traveling through the containment means to reduce and/or eliminate the deficiency of oxygen and preferably insuring the presence of oxygen in hot exhaust gases leaving the containment means. The prediction of the deficiency can be performed by using a computer model based on furnace inputs developed from empirical data.

The method can further comprise the steps of measuring the content of oxygen in the exhaust gases, communicating the results of these measurements to the process control means, wherein the process control means determines the deficiency of oxygen present in the exhaust gases entering the containment means. The process control means predicts the necessary flow of extra oxygen to be provided to minimize the effluent level of CO below environmentally regulated levels. Then, a controlled flow of extra oxygen rich gas is directed via the afterburning burner/injector means into the containment means. There, the oxygen rich gas mixes with the exhaust gases traveling through the containment means to reduce and/or eliminate the deficiency of oxygen and preferably to insure the presence of excessive oxygen in hot exhaust gases travelling through and leaving the containment means. This method can also be performed by measuring the content of CO in the exhaust gases instead of or in conjunction with the measuring oxygen. Similarly, other gases can be measured for this method, including nitrogen oxides and/or dioxins. It is preferred to measure these gases downstream the break-flange.

The method can also include the step of injecting through the afterburning burner/injector means at least one stream of atomized water into the containment means and toward at least one hot area present in the containment means. The stream of atomized water is preferably controlled by the process control means and is correlated with the increased flow of extra oxygen supplied to the afterburning burner/injector means, whereby the flow of atomized water reduces formation of nitrogen oxides and increases the efficiency of CO post-combustion inside the containment means with the injected extra oxygen. The stream of atomized water is preferably atomized by the flow of oxygen rich gas. Also, the excessive oxygen rich gas used in this method preferably has an average oxygen content in excess of 35%.

Similar to the fourth embodiment, the sixth embodiment of the invention, shown in FIGS. 15, 16, 17 and 18, relates to a burner/injector means designed to operate through a furnace side wall opening, preferably through the slag door opening. This burner/injector means comprises a single movable liquid-cooled burner/injector body 200 supported by a main movable arm 94 (FIG. 9) capable of moving the burner/injector body 200 from an idling/storage position wherein the operating end 214 of the burner/injector is located outside of the furnace to several positions in which the operating end 214 of the burner/injector means is positioned through the slag door opening and thus inside the furnace interior.

The burner/injector body 200 has at least one liquid-cooled enclosure having a mixing chamber 202 therein. The mixing chamber 202 has a surrounding wall 202A that may have a generally conical shape, wherein the surrounding wall can enlarge relative to the central axis of the mixing chamber 202 in a direction toward the discharge opening 221, thereby forming an outlet nozzle 221A for the mixing chamber 202.

The burner/injector body 200 has an outer water-cooled conduit 201, a partitioning water-cooled conduit 203, a first supply passage 208 for a first oxidizing gas formed between the outer fuel conduit 207, a first oxidizing gas outer conduit 209, a second supply passage 205 for fluid hydrocarbon fuel formed between an inner fuel conduit 206 and an outer fuel conduit 207, a third supply conduit 204, which contains an easily replaceable pipe made of erosion-resistant material for introduction into the furnace of solid fine particles (such as carbon bearing materials, deoxidizing materials, ferroalloys, basic slag forming materials, EAF dust, DRI, iron carbide, or a mixture of some of these materials) carried by a compressed carrier gas (such as air, nitrogen, carbon dioxide, oxygen, natural gas, or a mixture of some of these materials), and, optionally, an additional oxidizing gas supply conduit 210.

The burner/injector means has a providing means preferably comprising a third outlet opening 245 in fluid communication with the third supply conduit 204 and the mixing chamber 202 through which a compressed carrier gas flows in a direction along the central axis of the mixing chamber 202 and toward the discharge opening 221. When the carrier gas is air or other gas containing oxygen, the carrier gas can act as an auxiliary oxidizing gas. The pressure of the compressed carrier gas is preferably in excess of 10 psi, more preferably in excess of 20 psi, and most preferably in excess of 40 psi. The diameter of the third outlet opening 245 is preferably less than that of the discharge opening 221.

The burner/injector means has a supplying means preferably comprising at least one second outlet nozzle 211 for discharging fluid hydrocarbon fuel through the surrounding wall 202A of the mixing chamber 202 and into the mixing chamber, wherein this discharged hydrocarbon fuel is directed to partially surround the central axis of the mixing chamber 202 and further toward a mixing chamber discharge opening 221.

The burner/injector means also has a directing means preferably comprising at least one first outlet nozzle 212 in fluid communication with the first supply passage or conduit 208 for discharging of the first oxidizing gas. The first outlet nozzles 212 are disposed adjacent to the discharge opening 221 of the mixing chamber. The second outlet nozzle 211 directs fluid hydrocarbon fuel to mix with the compressed gas carrier and injected solid fines (when injection is carried out) at least partially inside of the mixing chamber 202 and then to mix with the first oxidizing gas streams outside of the mixing chamber 202, thereby forming a high temperature flame at the burner/injector operating end 214.

The burner/injector means of the sixth embodiment also has a fluid hydrocarbon fuel inlet 215 communicating with the second supply passage or conduit 205, a cooling water supply inlet 216 communicating with a cooling water supply passage 238 formed between the partitioning conduit 203 and outer surfaces of conduits 209 and 210, a cooling water outlet 217 communicating with a cooling water return passage formed between the outer water-cooled pipe 201 and the partitioning conduit 203, a compressed carrier gas and solid fines supply inlet 220 communicating with the third supply conduit 204, a first oxidizing gas inlet 218 communicating with the first supply passage 208, and, optionally, an additional oxidizing gas inlet 219 communicating with the additional oxidizing gas supply conduit 210.

The first outlet nozzles 212 of the directing means, which direct the high pressure first oxidizing gas, are preferably disposed outside and adjacent to the discharge opening 221. The flows of compressed carrier gas, solid particles (when used) and hydrocarbon fuel entering the mixing chamber expand, mix and interact with each other as they move throughout and exit the mixing chamber discharge opening in the direction generally along the central axis of the mixing chamber. The first outlet nozzles 212 direct the first oxidizing gas to partially surround and generally parallel to the central axis of the mixing chamber 202. Although the relationship is generally parallel, the multiple streams of the compressed first oxidizing gas expand toward each other after they are discharged through the first outlet nozzles forming high velocity enveloping first oxidizing gas stream. This high velocity first oxidizing gas stream envelopes, partially mixes with, and partially burns the hydrocarbon fuel and carbonaceous particles and further accompanies the stream of the unburned portion of injected solid material particles inside of the furnace interior, which increases the delivery range and the slag penetrating ability of the unburned portion of the injected particles.

Alternatively, the burning of the hydrocarbon fuel and the creation of the high velocity impinging flame can occur at least partially in a combustion chamber (which can be arranged similar to the combustion chamber 34 of the third embodiment of this invention) located inside the body of the burner/injector means. This combustion chamber arrangement is illustrated in FIG. 6. Such a combustion chamber, which allows flame shaping to occur, is located downstream of the mixing chamber. The sixth embodiment may further comprise the step of directing a second oxidizing gas having an oxygen content less than the first oxidizing gas into the combustion chamber to participate in combustion of the hydrocarbon fuel.

The burner/injector means can also comprise an injecting means for injecting an additional oxidizing gas. The additional oxidizing gas supply conduit 210 is in fluid communication with at least one additional oxidizing gas outlet nozzle 213. The burner/injector body 200 can be constructed so that the additional oxidizing gas supply pipe 210 and outlet nozzle 213 are disposed in a first liquid-cooled enclosure and the mixing chamber 202 is disposed in a second liquid-cooled enclosure or both are in the same enclosure. The additional oxidizing gas outlet nozzle 213 provides for injection of the compressed oxidizing gas having a positive pressure in excess of 50 psi, preferably in excess of 70 psi, and even more preferably in excess of 100 psi. It is preferred that the first and additional oxidizing gases have an oxygen content above 80%, and preferably above 90%. Each additional oxidizing gas outlet nozzle 213 should be capable of discharging a high velocity (preferably supersonic) stream of the additional oxidizing gas.

The additional oxidizing gas discharging nozzle 213 is preferably equipped with a supersonic converging-diverging section 230 having a circular outlet opening 231 communicating with an additional supersonic flow enhancing channel section 232 located downstream of the converging-diverging section 230. The converging-diverging section can preferably be disposed at an angle between 5°–45° downwardly below the central axis of the mixing chamber 202. Angles of 15°–30° are more preferred. The additional oxidizing gas should impinge the carbon-iron melt inside the EAF at approximately a 30°–55° angle and preferably between a 35°–45° angle when the burner/injector body 200 is positioned to operate above the surface of a molten bath inside the EAF in a parallel or inclined relationship to the bath.

It is preferable to use a supersonic flow enhancing section 232 which stabilizes the additional oxidizing gas flowing therethrough and has a regular geometric cross-sectional shape chosen from the family of regular geometric shapes including a circle, even side triangle, square, pentagon, hexagon or octagon. The flow enhancing section preferably has a first flow enhancing section zone 233 having a stepped-up average diameter-like dimension. The average diameter-like dimension of the first zone 233 should be at least a 3%, preferably 5% and even more preferably more than 7%, larger than the diameter of the circle outlet opening 231 of converging-diverging section 230 and the length of the first zone should be at least 1.05 times, preferably at least 1.25 times and even more preferably at least 1.5 times, larger length than the diameter of the circular outlet opening 231 of converging-diverging section 230. The flow enhancing section 232 may include subsequent downstream zones 234 having a stepped-up average diameter-like dimension. The average diameter-like dimension of each additional downstream zone has at least a 3%, preferably 5% and even more preferably more than 7%, larger average diameter-like dimension and at least a 1.05, preferably at least 1.25 times and even more preferably at least 1.5, times larger length than the average diameter-like dimension of the immediately upstream located zone of the flow enhancing section 232. It is preferred that the cross-section shape of each flow enhancing section 232 be a circle.

The above-described flow enhancing section arrangement is used to provide for efficient and stable supersonic velocity injection of the additional oxidizing gas for the purposes of slag foaming and iron-carbon melt refining. The flow enhancing sections provide significant improvement over a supersonic Laval-nozzle operation. A conventional Laval nozzle provides stable stream of injected gas only at very narrow operating band of injected gas flow. Deviation of flow from this narrow band leads to the destabilization stream and to the stream and to the inspiration of slag and molten metal inside the discharge nozzle, resulting in rapid destruction of the burner/injector body and undesirable splashing of the metal. The use of above-described flow enhancing section(s) provides a cure for the deficiency of oxidizing gas injection with the use of Laval nozzle(s) and allows formation of a well-stabilized jet or jets of the oxidizing gas injected through the outlet of the flow enhancing section(s) within a wide operating flow range, including broad subsonic and supersonic velocity regions.

As used throughout the specification and claims, the phrase "average diameter-like dimension" when used with respect to regular geometric shape cross-sections refers generally to the average distance between opposite walls which is measured along the line drawn through a center of the regular shape. The average diameter-like dimension can be calculated using the area of the cross section. That is, $$D = 2 \times (A/\pi)^{0.5} = 1.13 \times (A)^{0.5},$$

where D is the average diameter-like dimension, A is the cross-sectional area, and $\pi$ is the constant pi. A regular shape is one in which the length of all the sides is the same and all of the angles are the same.

A subsonic velocity of injected additional oxidizing gas is used during slag foaming operation, which is focused primarily on maintaining the optimized rate of CO production. A supersonic velocity, up to Mach 2.8, is preferably used to enhance the rapid melt refining. These well-stabilized jets provide for reduced splashing of slag and iron-carbon melt as well as increased slag penetrability and increased delivery rate of the additional oxidizing gas.

To distribute cooling water along the inner surface 239 of the operating end 214 front face 241, a water separating head 235 having water input slots 236 and 237 is installed to direct the cooling water around the mixing chamber 202, the supersonic converging-diverging section 230, and the flow enhancing sections 232. The water input slots direct cooling water moving forward the inner surface 239 to cool the walls of the mixing chamber and the nozzle for the injection of the additional oxidizing gas. The inner surface 239 is preferably equipped with cooling water guiding ribs 240 optimizing water distribution along the surface 239 to avoid local overheating.

An electric arc furnace using the sixth embodiment of the burner/injector means can operate similar to the two-lance operation described above for the fourth embodiment using a moving means. The operating end 214 is first positioned by the movable arm (shown in FIG. 9) in front of the open slag door. The operating end 214 thus faces the scrap pile through the slag door opening so that the flame can impinge the scrap located at the door and heat the contacted scrap. During the initial scrap melting stage, the burner/injector means uses fluid hydrocarbon fuel and the oxygen rich first oxidizing gas which is delivered respectively to the inlets 215 and 218. It is preferred that the compressed carrier gas (preferably air, which is simultaneously used as an auxiliary oxidizing gas) is also delivered to inlet 220. After the fluids are discharged through their respective discharge nozzles and openings, they are mixed and ignited, forming a high velocity flame at the operating end 214. During first several minutes of the initial stage of scrap melting the burner/injector means fires through the open slag door to heat and melt a light portion of scrap located at the slag door.

After at least a part of the light portion of the scrap located in the front of the burner has been melted and the heavier portion of the scrap pile contacted by the flame is preheated to above at least 1400° F., and preferably above 1800° F., it is preferred to adjust the flow of at least one of the hydrocarbon fuel, the first oxidizing gas and the optional second oxidizing gas to increase the ratio of total oxygen to hydrocarbon fuel to at least 50% above stoichiometric ratio for complete combustion. This causes the preheated scrap to be cut and burned creating large passages in the scrap pile. At this point of time the heat transfer from the impinging flame to the scrap is diminished and it is advisable to initiate the injection of solid material particles of carbonaceous fuel via the dispensing means with the stream of compressed air through the third supply conduit 204 so that carbonaceous fine particles at least partially participate in combustion inside of the flame envelope by mixing with oxygen supplied by the first oxidizing gas and the auxiliary oxidizing gas. The first and the auxiliary oxidizing gases partially burn the injected solid particles which increase flame luminosity, wherein the first oxidizing gas has a velocity sufficient to participate in burning the hydrocarbon fuel and combustible components of the injected solid particles, thereby creating a high velocity luminous impinging flame directed along the central axis of the mixing chamber and away from the burner/injector means to enhance the penetrating ability and the delivery range of the unburned portion of injected solid particles. It is desirable to partially reduce the flow of hydrocarbon fuel and/or to partially increase the flow of the first oxidizing gas to provide an additional amount of oxidizing gas available for partial oxidation of solid carbonaceous fuel. This carbonaceous solid particle injection provides for increased flame temperature and luminosity and for the generation of hot CO formed by the partial oxidation of the injected carbonaceous fuel. This protects the hot scrap from excessive oxidation by the flame and by ambient air inspirated through the open slag door. Increased penetrating ability and range of injected solid particles provide for efficient delivery of at least a portion of the injected particles throughout the slag layer to the slag/melt interface.

When compressed air, the carrier gas, is used as an auxiliary oxidizing gas, the hydrocarbon fuel is first mixed with compressed air creating an ignitable mixture comprised of fuel and oxygen. This mixture could be ignitable only at very high temperature conditions due to the presence of excessive fuel far in excess of the stoichiometric combustion ratio. But due to imperfect mixing existing inside the mixing chamber 202, the ignitable mixture discharged from the mixing chamber 202 will contain some gaseous pockets wherein the ratio between hydrocarbon fuel and oxygen is much closer to the stoichiometric ratio than the average stoichiometric ratio of the gaseous mixture leaving the mixing chamber 202. This allows the mixture to be ignited under the high combustion temperature conditions existing outside of the mixing chamber 202 where the hydrocarbon fuel further mixes with the oxygen-rich first oxidizing gas.

When carbon-bearing fines are injected within the solid material particles, the carbon-bearing fines are first mixed with oxygen present in the compressed carrier gas (e.g., air) and then the first oxidizing gas. The carbon particles thus ignite, generating a high luminosity flame due to the presence of small particles of burning carbon inside of the flame envelope.

The first oxidizing gas, which has an average oxygen content preferably higher than 80%, and even more preferably higher than 90%, is directed through the first outlet nozzles 212 to partially surround and either generally parallel or with several degrees angle toward the high velocity hydrocarbon fuel/compressed carrier gas mixture discharged through the discharge opening of the mixing chamber 202. The first oxidizing gas mixes with the fluids and particles discharged through the discharge opening 221 of the mixing chamber 202, adding enough oxygen amount to bring the new ratio of oxygen to fuel close to or above the stoichiometric ratio between total fuel and total oxygen involved. The ratio of oxygen to hydrocarbon fuel is preferably greater than 10%, and more preferably greater than 15%, above the stoichiometric ratio. The increased overall ratio of the fuel to oxygen insures stable and rapid combustion of the hydrocarbon fuel.

It is preferred that the discharge velocity of the first oxidizing gas be at least 25%, more preferably 50% and even more preferably 70%, greater than the velocity of the discharged gaseous mixture of the hydrocarbon fuel and the compressed carrier gas carrying solid particles, wherein the expansion of the multiple discharged streams of the first oxidizing gas towards each other creates multiple high velocity highly oxidizing gas streams partially surrounding the discharged gaseous mixture. The expansion of the multiple discharged streams of first oxidizing gas toward each other participates in the burning of the surrounded hydrocarbon fuel and the partial burning of combustible components of injected solid particles creating a rapidly expanding surrounded stream of hot combustion products containing hot luminous burning particles, wherein the surrounded stream of combustion products rapidly heats and accelerates the unburned portion of the injected particles minimizing the dispersion of the particles in the atmosphere of the furnace, thereby enhancing the delivery range and the slag penetrating ability of the unburned portion of the solid particles so that the particles can reach the slag/iron-carbon melt interface.

To speed the melting of scrap, it is advisable in many cases to ignite and cut preheated scrap. In such a case, when at least a part of the scrap pile located at the open slag door has been preheated at least above 1400° F., and preferably above 1700° F., it is advisable to substantially reduce the flow of hydrocarbon fuel and optionally to increase the flow of the first oxidizing gas (optionally up to the speed of sound or higher) so that preferably at least 50%, and more preferably at least 100% and even more preferably more than 200%, of excessive (above stoichiometric combustion amount needed to completely oxidize all involved hydrocarbon fuel) oxygen supplied with the flame is available to ignite and cut the preheated scrap pile.

It is advisable in many cases to continue the solid carbonaceous fuel injection during this period of scrap cutting. When the above-described scrap cutting cycle is used, a small portion of preheated scrap will be very rapidly oxidized by the excess oxygen. Oxidation of light scrap forms a high temperature light scrap burning zone which radiates heat and rapidly melts the scrap surrounding the scrap burning zone.

When scrap located at the slag door is at least partially melted and optionally cut so that adequate space is cleared for introduction of the sixth embodiment of the burner/injector means into the slag door without dangerously impacting the scrap pieces, the burner/injector supporting arm (FIG. 9) moves burner/injector operating end 214 toward the furnace interior through the slag door opening and the operating cycle is continued in a fashion similar to the two lance operation of the fourth embodiment of this invention described herein.

While the sixth embodiment of this invention has been discussed for particular use at the furnace slag door, it will be understood that other furnace openings can be used to operate the movable burner/injector means. In such cases, the moving mechanism of the burner/injector means could be design differently than described above.

Figure 19:
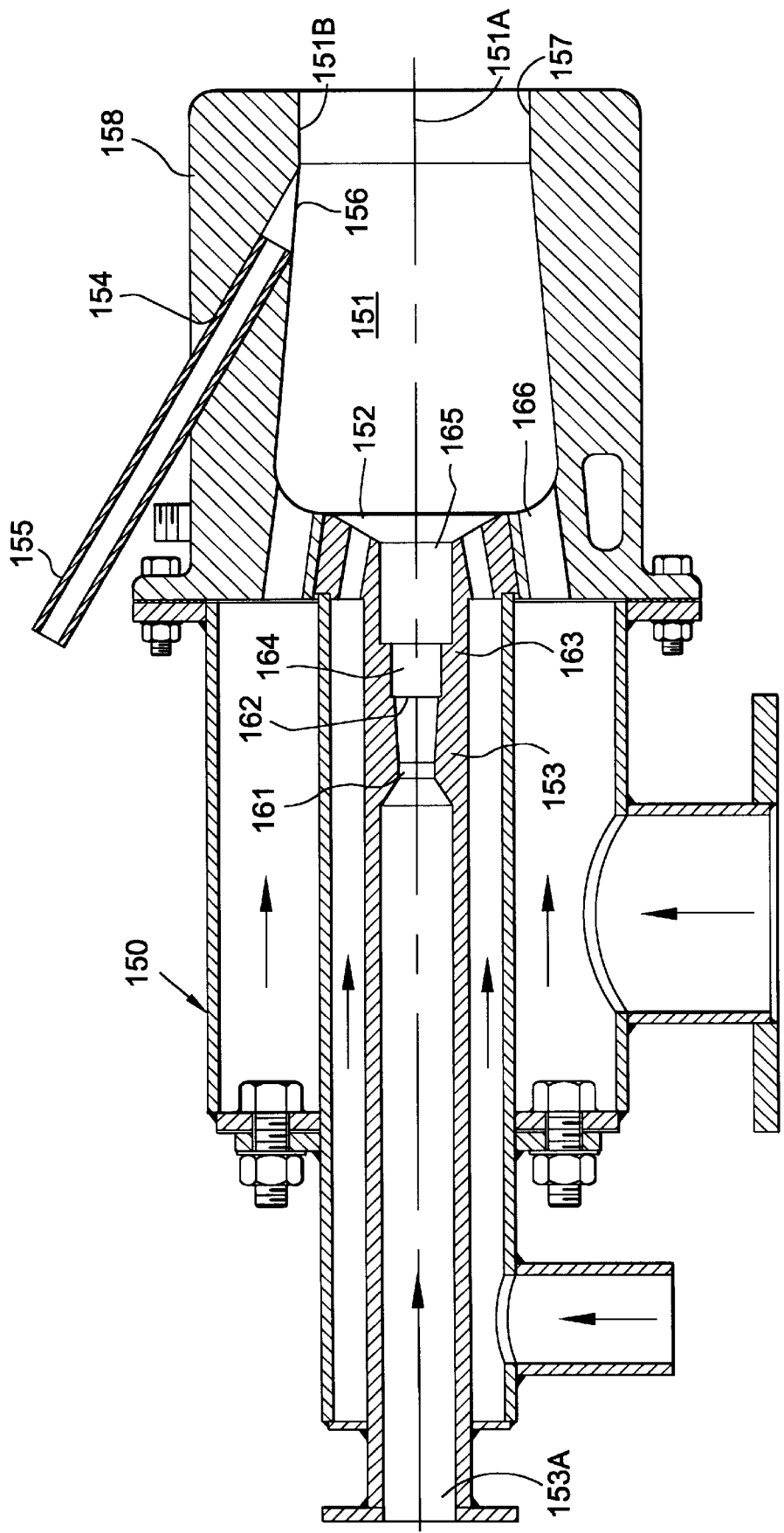
FIG. 19 shows a side cross-sectional view through the center of a seventh embodiment of a combustor of a burner/injector means in accordance with the invention, equipped with a means for injection of solid particles and an additional oxidizing gas.

FIG. 19 shows a seventh embodiment of the inventive burner/injector means comprising a combustor means 150 having a liquid-cooled body 158 having combustion chamber 151 therein. The combustion chamber 151 has a discharge flame outlet opening 157 (or flame discharge opening 157), which is preferably circular, and a combustion chamber wall 151B. The burner/injector means has a directing means preferably comprising a first outlet nozzle 153, shown as a single opening which preferably has a converging-diverging shape 161 of a Laval nozzle, for directing into the combustion chamber 151a first oxidizing gas. The burner/injector means also has an introducing means comprising at least one second outlet nozzle 152 for introduction of a fluid hydrocarbon fuel into the combustion chamber 151. The first oxidizing gas is used for hydrocarbon fuel combustion purpose and for high velocity (preferably supersonic) oxygen injection into the furnace through the combustion chamber 151. The burner/injector means can comprise a supplying means for supplying a controlled flow of products including the first oxidizing gas, wherein the pressure of the first oxidizing gas is substantially above critical pressure needed to maintain the first oxidizing gas above supersonic velocity. A portion of the supplying means is shown as supply tube 153A through which the first oxidizing gas is provided to the first outlet nozzle 153.

The burner/injector means preferably has at least one solid particle injecting means for injecting a stream of solid material particles carried by a flow of compressed gas into the combustion chamber 151 through a third supply conduit 154, which is an easily replaceable pipe 155, disposed therein, and protruding through the liquid-cooled body 158. The solid material particle injecting means has a third outlet opening 156 for forced injection of the particles through the adjacent flame discharge opening 157. As shown in FIG. 19, the solid particles are directed through the combustion chamber 151 toward the flame discharge opening 157 of the combustion chamber and further through the flame discharge opening toward the furnace interior. The solid particles can include, deoxidizing materials, carbon-bearing materials, ferroalloys, basic slag forming materials, electric arc furnace dust, direct reduced iron, iron carbide, or a mixture of some of these materials. The dimensions, orientations, and use of the nozzles, openings, and other components preferably are similar to the first and second embodiments of the present invention discussed above and shown in FIGS. 1 and 2 and FIGS. 3–5, respectively.

Preferably, the first outlet nozzle 153 has a supersonic converging-diverging section 161 having a circular outlet opening 162 communicating with an additional supersonic flow enhancing channel section 163 located downstream of the converging-diverging section 161. The supersonic flow enhancing section 163 has a regular geometric cross-sectional shape chosen from the family of regular geometric shapes including a circle, even side triangle, square, pentagon, hexagon or octagon. The pressure of the first oxidizing gas is maintained by the supplying means substantially above the critical pressure value so that the velocity of the first oxidizing gas exiting into the flow enhancing section is above supersonic velocity during at least a part of the burner firing cycle and during at least a part of the oxygen injection cycle when the flow of hydrocarbon fuel is substantially reduced or completely eliminated.

The flow enhancing section preferably has at least one zone 164 having a first stepped-up average diameter-like dimension. The average diameter-like dimension of the first zone 164 should be at least 3%, preferably 5% and even more preferably more than 7%, larger than the diameter of the circular outlet opening 162 of converging-diverging section 161 and the length of the first zone should be at least 1.05 times, preferably at least 1.25 times and even more preferably at least 1.5 times, larger size than the diameter of the circle outlet opening of converging-diverging section 161. The flow enhancing section 163 can also include subsequent downstream flow enhancing section zones 165 having a stepped-up average diameter-like dimension. The average diameter-like dimension of each additional zone should be at least 3%, preferably 5% and even more preferably more than 7%, larger than the average diameter-like dimension of the adjacent upstream flow enhancing zone and the length of each additional zone should be at least 1.05 times, preferably have at least 1.25 times and even more preferably at least 1.5 times, larger than the average diameter-like dimension of the adjacent upstream flow enhancing section zone. It is preferred that each flow enhancing section have a cross section shape of a circle.

This burner/injector means described above has the capability to: (a) maintain a high downstream supply pressure of the first oxidizing gas (thereby reducing the dimension and cost of the supply piping), (b) provide a high flow of the first oxidizing gas reaching sonic or/and supersonic velocity inside of a converging-diverging nozzle during high firing rate burner operation while also eliminating instability of the flow characteristics in the flow enhancing section prior to the introduction of the first oxidizing gas into the combustion chamber, allowing for a stable, low-noise combustion process to occur in the liquid-cooled combustion chamber 151; and (c) discharge the first oxidizing gas at a supersonic velocity toward hot scrap, slag, and iron-carbon melt with a substantially increased penetrability, delivery range, and efficiency of injected oxidizing gas for the purposes of scrap cutting and burning, slag foaming, and iron-carbon melt refining.

This seventh embodiment of the burner/injector means can optionally be equipped with multiple second oxidizing gas outlet openings 166 for introduction into the combustion chamber of a second oxidizing gas, preferably having a lower oxygen content than the first oxidizing gas, which increases the volume and the velocity of the impinging flame while reducing the flame adiabatic temperature. The controlled flow of a second oxidizing gas should have an average oxygen content preferably between 20% and 50%, wherein the second oxidizing gas flows into the combustion chamber to participate at least partially in the hydrocarbon fuel burning during at least a part of burner firing cycle, thereby reducing the temperature of the flame. The second oxidizing gas may be introduced by using the design of the second oxidizing gas conduit and second oxidizing gas multiple openings similar to the design shown in FIG. 1 of the first embodiment of the invention.

The seventh embodiment can also encompass a supplemental directing means for a high velocity, oxygen rich additional oxidizing gas toward the iron-carbon melt in the furnace through an additional discharge nozzle opening located adjacent to the combustion chamber and directed toward the interior of the furnace. The additional oxidizing gas may be introduced by using the design of the additional supply conduit similar to the design shown as reference numeral 27 in FIGS. 3, 4, and 5 of the second embodiment of this invention. The nozzle for introducing the additional oxidizing gas can also include a converging-diverging nozzle and downstream flow enhancing zone as discussed in the sixth embodiment of the present invention and shown as reference numerals 230 and 233, respectively, in FIG. 15.

It is important for post-combustion of CO inside the furnace to inject additional oxygen toward predetermined areas inside the electric arc furnace affected by burner/ injector means where CO is predominantly generated for post-combustion, thus increasing the efficiency of CO post-combustion. It is therefore advisable to equip the combustion control system responsible for controlling the flows of hydrocarbon fuel, solid carbonaceous fuel, the first oxidizing gas and, optionally, the second oxidizing gas to communicate with the kwh meter of the furnace to acquire information about the electrical energy input and to use this information together with other process information related to the heat of combustion and oxidation being introduced by burner/injector means. The control system should use the cumulative energy input to continually optimize flame characteristics throughout the melt down cycle, including the injection of oxygen by the combustors to cut heavy scrap when such an optional technique is utilized to rapidly create an empty space in front of the combustors. The process parameters monitored may include the electrical energy introduced by electrodes, hydrocarbon fuel introduced by the burners, the mass of charged and/or injected solid carbonaceous fuel, the total amount of oxygen used, the furnace pressure, and exhaust gas characteristics, including the temperature of exhaust gases, the content of oxygen and/or CO in exhaust gases and other characteristics of the exhaust gases correlating to the level of CO and other hazardous emissions being discharged into the environment from the electric arc steelmaking process. The acquired data should preferably be used to establish an appropriate time at which the injection of carbonaceous fuel, oxygen, and, optionally, the injection of basic slag forming material and/or electric arc dust should be initiated.

Solid particles injection preferably is initiated after a predetermined amount of heat has been introduced into the furnace. The predetermined amount of heat is measured as the amount of energy provided by the electric arc or, alternatively, as the amount of energy provided by the electric arc in combination with auxiliary heat sources, including the burner/injector means.

When the electric arc furnace operates without the heel containing the molten metal retained from the previous heat, it is advisable to delay the combined carbonaceous fuel and oxidizing gas injection until sufficient iron-carbon melt and slag is formed in the furnace. For a burner/injector means located at the hot spot area, it is advisable to delay the combined injection until at least 100 kwh is introduced into the furnace by the electric arc and the combustors per ton of charged solid ferrous metallic materials. The burner/injector means located at the cold spots should delay the combined injection until at least 150 kwh is introduced to the electric arc and the combustors per ton of charged solid ferrous metallic. When the electric arc operates with the molten heel the delay could be reduced or completely eliminated.

It is also desirable to equip the electric arc furnace with a control system capable of simultaneously acquiring data on the amount of electric energy introduced by electrode(s), the natural gas combustion energy introduced by the combustors, and the chemical energy being introduced by the injected oxidizing gas and carbonaceous fuel. This data should be used to stage the time of post-combustion oxygen injection so that the amount of CO generated inside the electric arc furnace is post-combusted prior to the time exhaust gases leave the furnace, so that the maximum percentage of exothermic heat which has been released inside the furnace is actually transferred to the scrap and the iron-carbon melt. This control system can include or work in conjunction with the process control means described in the fifth embodiment of the invention.

Additionally, while the invention has been discussed with fuel and oxidizing gases being introduced in the combustion chamber of the burner/injector means through their respectively identified openings, it should be understood that the fuel, the first oxidizing gas, and the second oxidizing gas supplies may be interchanged and the burner/injector means will still be able to function.

While this invention describes the use of burner/injectors for EAF in the steelmaking process, it should be understood that other metal producing processes utilizing burners can be improved by the use of the burner/injector methods and apparatuses that have been described herein. While the invention has been disclosed with burner/injectors utilizing combustors equipped with means for solid carbonaceous material and additional high velocity oxygen injecting, it should be understood that it is not necessary for all involved combustors to be equipped with such injecting means and that when at least one combustor provides for solid particle injecting means. For example, the invention will be still able to function as soon as means are provided for high velocity oxygen injection toward the same predetermined area where carbonaceous material is also provided. Similarly, it is enough to provide a single burner/injector equipped with solid particle injection means to be able to carry the staged injection of several flows of different solid particles or inject a mixture of solid carbonaceous fuel, basic slag forming material, EAF dust, and/or other solid particles.

While this invention describes the use of the burner/injector utilizing a preferred sequence and preferred combination of material flows simultaneously introduced by the burners, it should be understood that other firing and introduction sequences and combinations of materials flows can be used during the steelmaking process and the burner/injector means will still be able to function. For example, it can be beneficial in some cases to inject solid particles (carbonaceous fuel, basic slag forming material and others) through the flame formed by the burner/injector means during the entire steelmaking cycle or during the majority of the steelmaking cycle.

While this invention describes the use of the movable burner/injector means for operating through the slag door opening and the preferred design of the moving mechanism, it should be understood that the movable burner/injector may operate through other openings in the furnace sidewall and/or in the furnace roof and that the moving mechanism transporting the operating ends of the burner/injector and oxygen injecting lance closer to the iron-carbon melt surface still can be employed, and the burner/injector means will still be able to function.

Use of described above embodiments improve the operating performance of the EAF steelmaking process by altering the process of slag formation and slag discharging from the furnace and by changing the location, the time and the pace of introduction of slag forming materials, and the dynamics and the rate of reaction inside the slag and between slag and iron-carbon melt.

Inventive slag practices exist which can use the burner/injector means to perform additional process steps, which is the eighth embodiment of this invention. This embodiment of this invention relates to the steelmaking process which improves slag control to provide for: (a) reduced consumption of basic slag forming materials per ton of steel produced; (b) decreased heat consumption per ton of steel produced with colder discharged slag; (c) reduced tapped steel oxidation and, therefore, deoxidizing materials consumption; and (d) reduced sulfur and nitrogen content of tapped steel. The use of the eight embodiment described herein provides also improvements including: (a) controlled input of the materials into multiple predetermined zones of the furnace; (b) improved control of slag characteristics including slag fluidity, basicity, and oxygen activity of the slag; (c) earlier slag door availability for the slagging off step; and (d) the multi-point injection of supersonic oxygen and carbon-bearing materials and/or other deoxidizing materials to allow for rapid change in slag temperature and FeO content.

When an EAF steelmaking cycle employs the eighth embodiment, the majority of the slag to be discharged during production of the heat is discharged from the furnace during the first slagging off step after at least 50%, and preferably more than 70% and even more preferably more than 80%, of the total silicon is charged into the furnace for production of given heat as metallic silicon is oxidized, but before less than 50%, and preferably less than 40% and even more preferably less than 30%, of total basic slag forming material charged during production of given heat is dissolved in the slag.

The discharged slag has a reduced basicity which is substantially lower than the basicity of the final slag present in the furnace during steel tapping. Basicity of slag is defined as the percentage of CaO over the percentage of $SiO_2$. It is advisable to maintain the final slag basicity above 2.5, preferably above 3 and even more preferably above 3.5, while maintaining the basicity of the slag discharged during the first slagging off cycle preferably below 3.0, more preferably below 2.2 and even more preferably below 1.8 but preferably above 1.2. Such a reduction in slag basicity is caused by earlier oxidation of silicon during scrap melting and delayed charging and dissolution of the major portion of basic slag forming materials.

This allows a reduction of heat losses occurring with discharging colder slag during first slagging off and utilization of the majority of the charged basic slag forming materials for future dissolving inside of the reduced volume of the slag after the first slagging off step takes place to increase the basicity of the final slag or to maintain the conventional basicity of final slag while charging the reduced total amount of basic slag forming materials.

To perform such earlier step of the first slagging off, the furnace operator should effectively carry out scrap melting with the use of at least one burner/injector means equipped with an oxidizing gas injector providing oxygen for rapid oxidation of metallic silicon, wherein the burner/injector means is installed through the side wall of the furnace or at the slag discharge door of the furnace to provide for fluidity of the heated slag and create a slag traveling passage, which allows the slag to be discharged from the furnace at the described above moment of time and preferably without delays and interruption of electrical energy input during this earlier stage of the steelmaking process.

In order to efficiently use this slagging off practice the major portion or the entire volume of the final, highly basicity slag (which is formed later, after the first slagging off step has taken place) should preferably be retained in the furnace after the previous heat has been tapped. This retained high basicity slag should then participate in the production of the new heat and to provide input of hot basic component for formation of new slag prior to the first slagging off step. The use of this large volume of the retained high basicity final slag of the previous heat earlier in steelmaking practice for production of new heat will maintain the desired slag volume and slag characteristics (such as basicity and fluidity) during the colder stage of first slag discharging when the described above slagging off practice is used.

Charging of basic slag forming materials in the furnace during production of heat using this eighth embodiment should be preferably staged in such a fashion that the major part of the total amount of the basic slag forming materials which is to be charged for the production of new heat is prevented from participation in slag dissolution before the first slagging off step takes place. This can be accomplished by the delayed charging of the major portion of basic slag forming materials only after the moment when the first slagging off is performed. In other cases when furnace operation requires that more than 50% of slag forming materials be charged prior to the first slagging off stage, the excessive amount (exceeding 50%) of total basic slag forming materials should be preferably charged in the manner preventing any sufficient contact between the accumulated slag and this excessive portion prior to slagging off step, for example, on the top of the backcharged scrap bracket.

In EAFs operating in accordance with the eighth embodiment of this invention and utilizing multiple scrap charges, the first slagging off step should preferably take place prior to the last scrap charging or shortly after the last scrap charging. This first slagging off step preferably takes place before all metallics to be used in production of given heat are melted down and optionally before the last portion of solid metallics is charged into the furnace for production of given heat. The volume of slag discharged during the first slagging off step conducted under the described above conditions should be preferably at least equal or should exceed the volume of slag retained from the previous heat. An additional slagging off could also take place periodically or continually to maintain the presence of thick foamy slag layer during the final stages of scrap melting and superheating.

Retained final high basicity slag can preferably be treated to reduce the temperature and FeO content and to increase the basicity of the treated slag before the first solid metallics are charged for production of a new heat. Such treatment may include batch charging on the top of the slag and/or injection via at least one burner/injector means on the top and preferably into the slag of at least one of the materials including basic slag forming material(s), such as lime, limestone, dolomitic lime or raw dolomite, bag house dust, coal, other solid carbonaceous materials, ferroalloys such as FeSi, FeC, or other slag deoxidizing materials.

Substantial increases in the volume of the retained slag allow recycling the heat content and the valuable components of the final slag, such as CaO, FeO, MgO and the like, for the use in the following heat production. This slag retaining and treating practice can be efficiently used in a steelmaking processes which either uses or does not use the step of retaining a molten steel heel inside of the furnace.

Slag can similarly be pretreated during the final stages of steelmaking process by carrying out the injection and/or batch charging of the above-described materials into the furnace slag prior to steel tapping. This step allows reduction of the final slag temperature and FeO content, and/or an increase in slag basicity while maintaining the thick foamy slag layer preferably covering the entire surface of the iron-carbon melt during the hottest stages of steelmaking cycle. The similar treatment of final slag prior to and during the heat tapping will also save at least a part of operating time which otherwise would be spent performing the described above slag treatment after the produced steel is tapped.

In cases when high melting point slag coating of furnace banks and walls is needed to increase longevity of furnace, the final slag can be altered with introduction in the slag of a portion of basic slag forming material which may preferably include raw dolomite, dolomitic lime, limestone, or burnt lime with or without additional solid slag deoxidizing material (for example solid carbonaceous material), thereby increasing the melting point of slag. Such introduction of materials is preferably carried out by at least one burner/injector means, resulting in rapid formation of high melting point slag contacting the surfaces of colder furnace banks and walls and creating the high melting point slag coating.

When low nitrogen steel is produced, the solid materials injection for purpose of slag foaming should preferably be directed toward the hottest furnace zone created by electric arc. The hottest zone, however, is the most susceptible to nitrogen pick-up from the furnace atmosphere and therefore should be well insulated by foamy slag. The injected materials should, therefore, include slag deoxidizing material, (e.g., solid carbonaceous particles) to foam and to partially deoxidize the slag and, even in some cases, to partially carburize the melt.

Localized carburizing of the iron-carbon melt by solid carbonaceous particles injection into hottest furnace spot created by electric arc will maintain nitrogen flushing from the melt with CO bubbles longer in the hottest furnace region. This improves the slag foaming and deoxidation around the arc and therefore will reduce the nitrogen and oxygen content of tapped steel.

A carrier gas other than compressed air or nitrogen is preferably used for injection of carburizing and deoxidizing solid particles. Compressed carbon dioxide, natural gas, or a mixture thereof is preferably used to eliminate nitrogen input and to reduce the burning and oxidation of injected particles with compressed air. The preferred apparatus for such injection can be provided with the use of the sixth or seventh embodiment of this invention, described herein, preferably utilizing compressed carbon dioxide, natural gas or a mixture thereof as a carrier gas and as a substitution for the first oxidizing gas. This substitution enhances penetration of injected particles through foamy slag and increases the delivery range of the injected particles, without burning the injected particles and oxidizing the slag in the furnace zone targeted by the injection.

The injected materials can also include the solid basic slag forming material(s) such as lime, limestone, dolomitic lime, or raw dolomite. The use of non-calcined, raw basic slag forming materials is often advantageous for the slag foaming purposes because an additional cooling effect results from calcining reactions taking place in the slag and the additional carbon dioxide release inside the slag by calcining of the limestone and raw dolomite.

Finally, while this invention has been described in detail with particular reference to preferred embodiment thereof, it will be understood that variations and modifications can be effected within the spirit and scope of this invention as previously defined and as defined in the claims.

What is claimed:

1. A burner/injector means for generating a high velocity flame for use in a furnace, comprising:
   a) a liquid-cooled body defining a combustion chamber therein having a flame discharge opening and a combustion chamber wall;
   b) directing means for directing a controlled flow of a first oxidizing gas into said combustion chamber in a direction substantially along a central axis of said combustion chamber and toward the flame-discharge opening of said combustion chamber, wherein said directing means has a first outlet nozzle having a converging-diverging section having a circular outlet opening having a-diameter and a supersonic flow enhancing section located downstream of the converging-diverging section of said first outlet nozzle for stabilizing the first oxidizing gas flowing therethrough wherein the supersonic flow enhancing section of said directing means has a regular cross-sectional shape, wherein said directing means has at least one flow enhancing section zone, wherein a first flow enhancing section zone of said directing means is located immediately downstream of the converging-diverging section of said first outlet nozzle and has at least a 3% larger average diameter-like dimension and at least a 1.05 times larger length than the diameter-of the circular outlet opening of said converging-diverging section, and wherein each sequential downstream flow enhancing section zone has at least a 3% larger average diameter-like dimension and at least a 1.05 times larger length than the average diameter-like dimension of the adjacent upstream flow enhancing section zone; and
   c) providing means for providing a controlled flow of fluid fuel into said combustion chamber through at least one second outlet nozzle disposed at least partially surrounding the central axis and in fluid communication with said combustion chamber.

2. The burner/injector means of claim 1, further comprising supplying means for supplying a controlled flow of the first oxidizing gas to the inlet of the first outlet nozzle of said directing means, wherein the pressure of the first oxidizing gas is substantially above the critical pressure value to maintain the velocity of the first oxidizing gas exiting into the flow enhancing section above supersonic velocity.

3. The burner/injector means of claim 1, further comprising introducing means for introducing a controlled flow of a second oxidizing gas into said combustion chamber.

4. The burner/injector means of claim 1, further comprising injecting means for injecting a stream of compressed carrier gas carrying solid particles through a third supply conduit located through said burner body.

5. The burner/injector means of claim 4, wherein the third supply conduit of said injecting means has an outlet opening located adjacent to said combustion chamber which directs the carrier gas and solid particles into a hot furnace interior through the flame discharge opening of said combustion chamber.

6. The burner/injector means of claim 1, wherein the dimensions of said combustion chamber, flame discharge opening, the circular outlet opening of the converging-diverging section, and the opening for providing fluid fuel of said providing means prevent said combustion chamber from plugging.

7. The burner/injector means of claim 1, further comprising a supplemental directing means for a high velocity, oxygen rich additional oxidizing gas which is directed toward an iron-carbon melt in the furnace through an additional discharge nozzle opening located adjacent to said combustion chamber and directed toward the interior of the furnace.

8. The burner/injector means of claim 3, further comprising injecting means for injecting a stream of compressed carrier gas carrying solid particles through a third supply conduit located through said burner body.

9. The burner/injector means of claim 8, wherein the third supply conduit of said injecting means has an outlet opening located adjacent to said combustion chamber which directs the carrier gas and solid particles into a hot furnace interior through the flame discharge opening of said combustion chamber.

10. The burner/injector means of claim 3, wherein the dimensions of said combustion chamber, flame discharge opening, the circular outlet opening of the converging-diverging section, and the opening for providing fluid fuel of said providing means prevent said combustion chamber from plugging.

11. The burner/injector means of claim 1, wherein the regular cross-sectional shape of the supersonic flow enhancing section of said directing means includes a circle, even side triangle, square, pentagon, hexagon or octagon.

* * * * *